(12) United States Patent
Sumioka

(10) Patent No.: US 11,825,197 B2
(45) Date of Patent: Nov. 21, 2023

(54) VIBRATION ACTUATOR CONTROL APPARATUS, VIBRATION DRIVING APPARATUS, INTERCHANGEABLE LENS, IMAGING APPARATUS, AND AUTOMATIC STAGE

(71) Applicant: CANON KABUSHIKI KAISHA, Tokyo (JP)

(72) Inventor: Jun Sumioka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/868,268

(22) Filed: Jul. 19, 2022

(65) Prior Publication Data

US 2023/0033426 A1    Feb. 2, 2023

(30) Foreign Application Priority Data

Jul. 29, 2021  (JP) ................. 2021-124633

(51) Int. Cl.
*H04N 23/68* (2023.01)
*H04N 23/54* (2023.01)
*H04N 23/67* (2023.01)

(52) U.S. Cl.
CPC .......... *H04N 23/683* (2023.01); *H04N 23/54* (2023.01); *H04N 23/67* (2023.01); *H04N 23/685* (2023.01)

(58) Field of Classification Search
CPC ...... H04N 23/683; H04N 23/54; H04N 23/67; H04N 23/685; H04N 23/55; G03B 3/10; G03B 2205/0007; G03B 2205/0046; G03B 2205/0061; H02N 2/026; H02N 2/062
See application file for complete search history.

(56) References Cited

U.S. PATENT DOCUMENTS

| | | | |
|---|---|---|---|
| 9,531,953 B2* | 12/2016 | Kwon | .................. H04N 23/687 |
| 9,843,276 B2 | 12/2017 | Morita | |
| 10,187,578 B2* | 1/2019 | Sumioka | .................. H02N 2/06 |
| 2016/0226402 A1 | 8/2016 | Morita | |
| 2017/0019601 A1* | 1/2017 | Sumioka | ............... H02N 2/0075 |
| 2017/0093304 A1* | 3/2017 | Sumioka | ............... H02N 2/0015 |
| 2018/0159447 A1* | 6/2018 | Sumioka | ................ H10N 30/20 |
| 2018/0331634 A1* | 11/2018 | Sumioka | ................ G03B 19/12 |

FOREIGN PATENT DOCUMENTS

JP     2016-144262 A     8/2016

* cited by examiner

*Primary Examiner* — Padma Haliyur
(74) *Attorney, Agent, or Firm* — Canon U.S.A., Inc. IP Division

(57) ABSTRACT

A vibration actuator control apparatus includes a control amount output unit. The control amount output unit includes a trained model trained by machine learning configured to output a control amount, if the target speed and a value based on the target position are input to the trained model, to move the contact body relative to the vibrator. The value based on the target position is a value based on a product of first and second values. The first value is a value based on a difference between the target position and a detection position detected from the vibration actuator moved based on the control amount. The second value is a value based on a ratio between the control amount output from the control amount output unit and a value output from the trained model if the target speed and a predetermined value are input to the trained model.

19 Claims, 20 Drawing Sheets

FIRST VIBRATION MODE

SECOND VIBRATION MODE

H-LAYER: SIGMOID FUNCTION

Z-LAYER: LINEAR FUNCTION

RESULTS OF CALCULATIONS BY Adam

LEARNING DATA

RESULTS OF OPTIMALIZATION CALCULATIONS (5000 LOOPS)
X-LAYER = 2, H-LAYER = 7, Z-LAYER = 2

EXAMPLE OF LEARNING OF CONTROL AMOUNT
(PHASE DIFFERENCE)

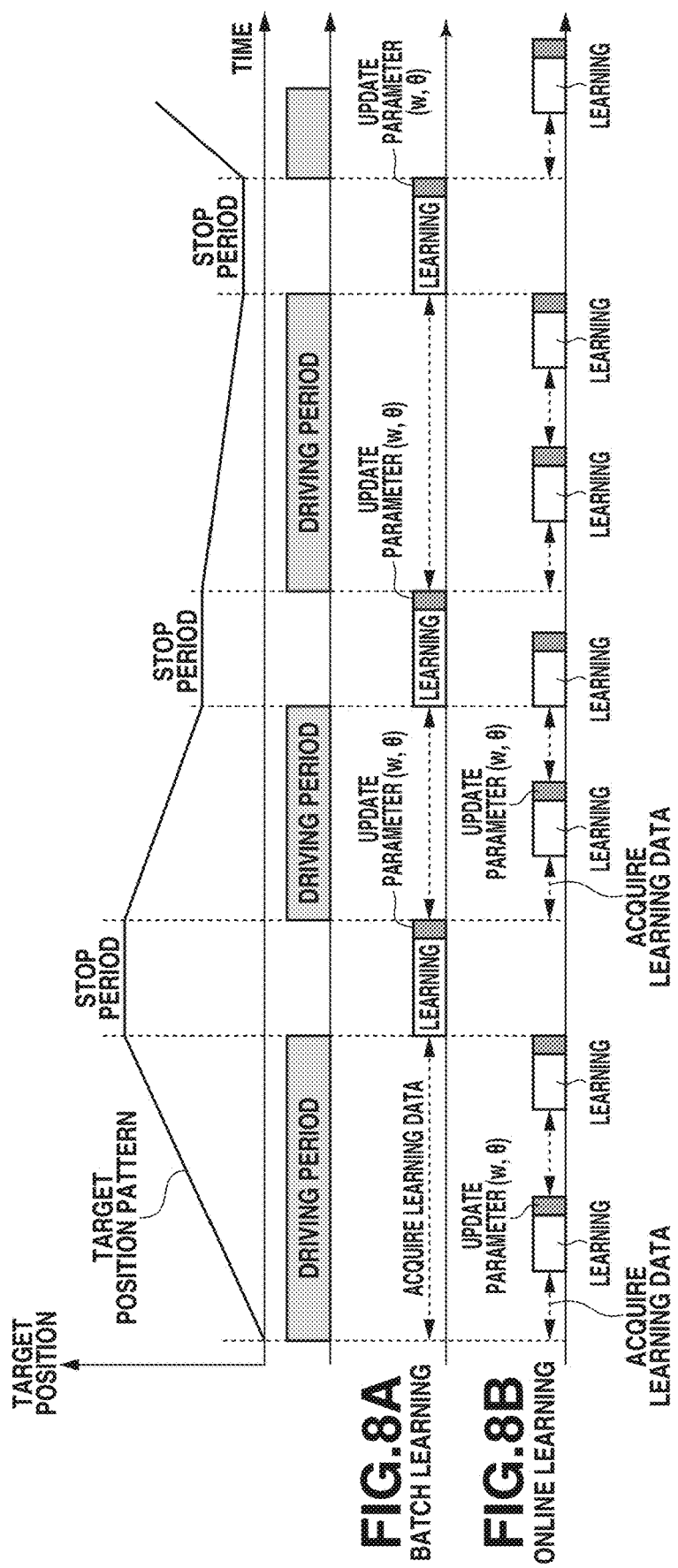

PHASE DIFFERENCE-SPEED CHARACTERISTICS

FREQUENCY-SPEED CHARACTERISTICS

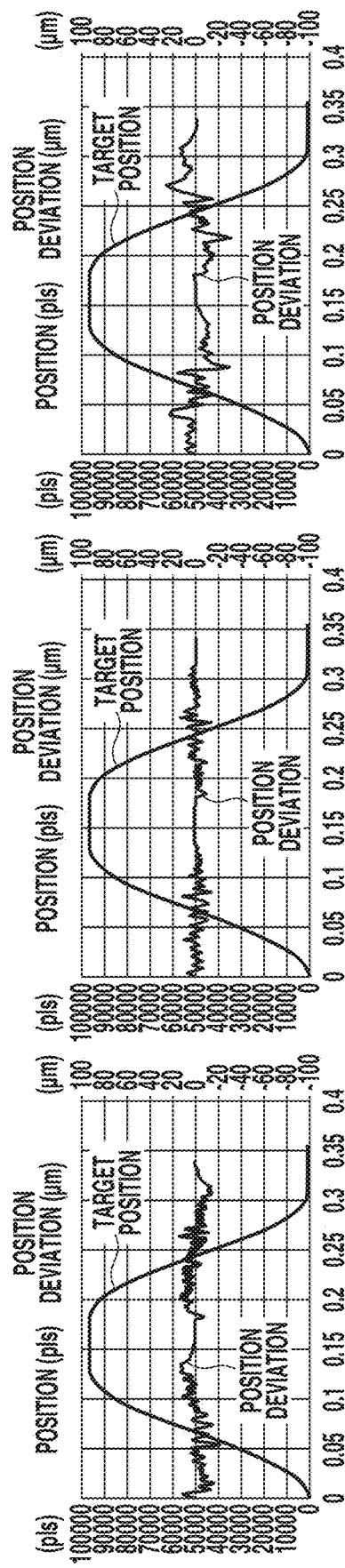

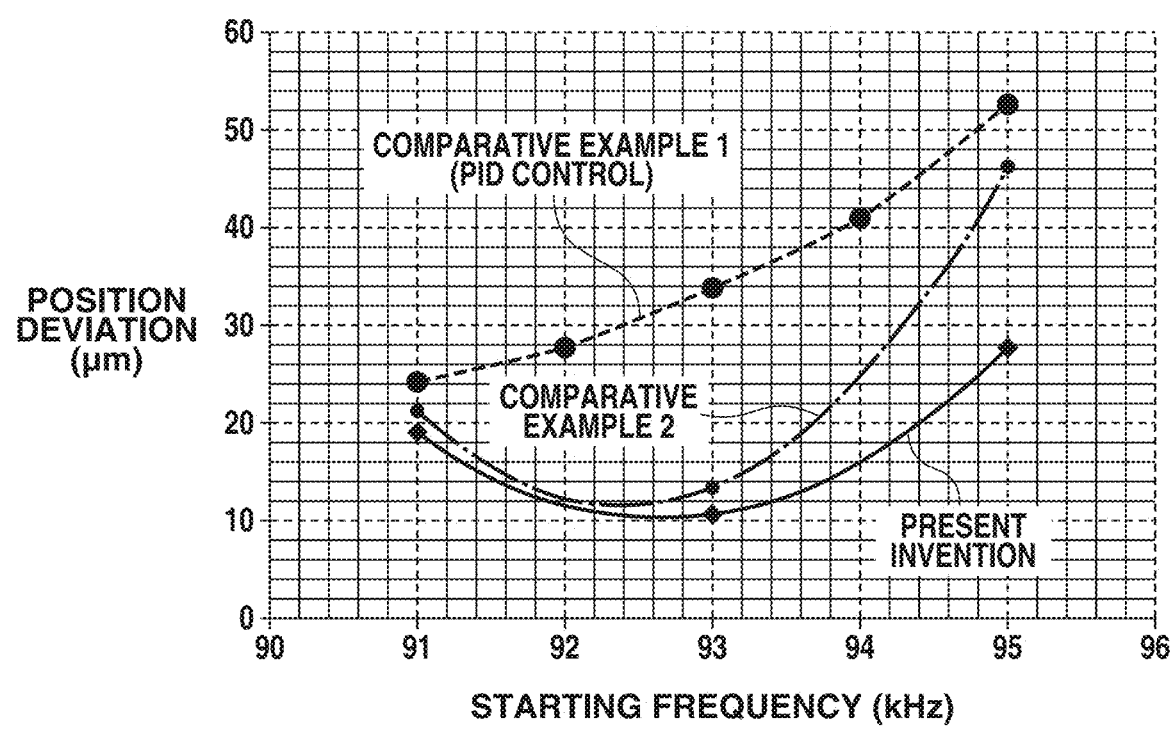

CONTROL USING PHASE DIFFERENCE AND FREQUENCY

CONTROL USING PULSE WIDTH AND FREQUENCY

VIBRATION ACTUATOR CONTROL APPARATUS, VIBRATION DRIVING APPARATUS, INTERCHANGEABLE LENS, IMAGING APPARATUS, AND AUTOMATIC STAGE

BACKGROUND

Field of the Disclosure

The present disclosure relates to a vibration actuator control apparatus, a vibration driving apparatus, an interchangeable lens, an imaging apparatus, and an automatic stage.

Description of the Related Art

A vibration motor is described as an example of a vibration actuator. The vibration motor is a non-electromagnetic driving motor configured to apply alternating-current voltages to an electro-mechanical energy conversion element such as a piezoelectric element connected to an elastic body, thereby causing the element to generate a high-frequency vibration, and configured to extract vibration energy of the high-frequency vibration as a continuous machine motion.

The vibration motor has excellent motor performance, such as small size and light weight, high accuracy, and low speed and high torque. However, since the vibration motor has non-linear motor characteristics, it is difficult to model the vibration motor. Since controllability of the vibration motor changes depending on the driving condition and the temperature environment, a control system for the vibration motor needs to be cleverly configured. Further, the vibration motor has many control parameters, such as a frequency, a phase difference, and a voltage, and thus an adjustment of the vibration motor can be complicated.

FIG. 13A is a control block diagram of a vibration control apparatus using conventional and general proportional-integral-derivative (PID) control (see Japanese Patent Application Laid-Open No. 2016-144262). Alternating-current voltages (alternating current signals) in two phases (an A-phase and a B-phase) are output from a driving circuit to which control amounts, described below, are input. Then, a frequency (1/period), a phase difference, and a voltage amplitude (hereinafter also referred to simply as a voltage) of each of the alternating-current voltages in the two phases output from the driving circuit are controlled, whereby it is possible to control an actual speed (detection speed) of a vibration motor (FIG. 13B). The voltage amplitude is variable depending on a pulse width input from a PID controller, described below, to the driving circuit.

A position deviation that is a difference (a value based on the difference) between a target position of the vibration motor indicated by a position generation unit (a position indication unit) and an actual position (a relative position or a detection position) of the vibration motor detected by a position detection unit is input to the PID controller. Then, control amounts (the frequency, the phase difference, and the pulse width) subjected to PID calculations based on the position deviation input to the PID controller are sequentially output from the PID controller every control sampling period and input to the driving circuit. Then, the alternating-current voltages in the two phases are output from the driving circuit to which the control amounts are input, and the speed of the vibration motor is controlled based on the alternating-current voltages in the two phases output from the driving circuit.

Then, position feedback control is performed based on these parameters. Hereinafter, the control sampling period will also be referred to simply as the sampling period.

SUMMARY

Embodiments of the present disclosure provide a vibration actuator control apparatus including, as a main control amount output unit, a control amount output unit different from that of a conventional PID controller.

According to an aspect of the present disclosure, a vibration actuator control apparatus that, with a vibration generated in a vibrator, moves a contact body in contact with the vibrator relative to the vibrator, includes a control amount output unit configured to, in a case where a target speed and a target position for moving the contact body relative to the vibrator are input to the control amount output unit, output a control amount for moving the contact body relative to the vibrator, wherein the control amount output unit includes a trained model trained by machine learning configured to output the control amount, in a case where the target speed and a value based on the target position are input to the trained model, to move the contact body relative to the vibrator, wherein the value based on the target position is a value based on a product of a first value and a second value, wherein the first value is a value based on a difference between the target position and a detection position detected from the vibration actuator moved based on the control amount, and wherein the second value is a value based on a ratio between the control amount output from the control amount output unit and a value output from the trained model in a case where the target speed and a predetermined value are input to the trained model.

Further features of various embodiments will become apparent from the following description of exemplary embodiments with reference to the attached drawings.

BRIEF DESCRIPTION OF THE DRAWINGS

FIGS. 8A and 8B are timing charts illustrating batch learning and online learning in a machine learning unit.

FIGS. 13A, 13B, 13C, and 13D are a diagram (a control block diagram) illustrating a vibration driving apparatus using conventional and general proportional-integral-derivative (PID) control, and the like.

FIGS. 14A, 14B, and 14C illustrate results of performing feedback control of a vibration motor in a predetermined target position pattern according to the first exemplary embodiment of the present disclosure.

FIG. 15 illustrates results indicating robustness of a control apparatus according to the first exemplary embodiment of the present disclosure.

DESCRIPTION OF THE EMBODIMENTS

Figure 13A:
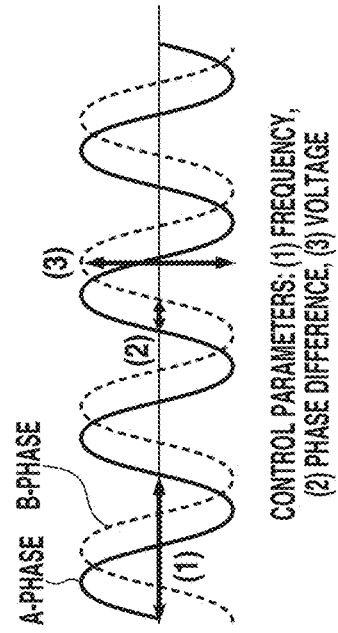
Figure 13B:
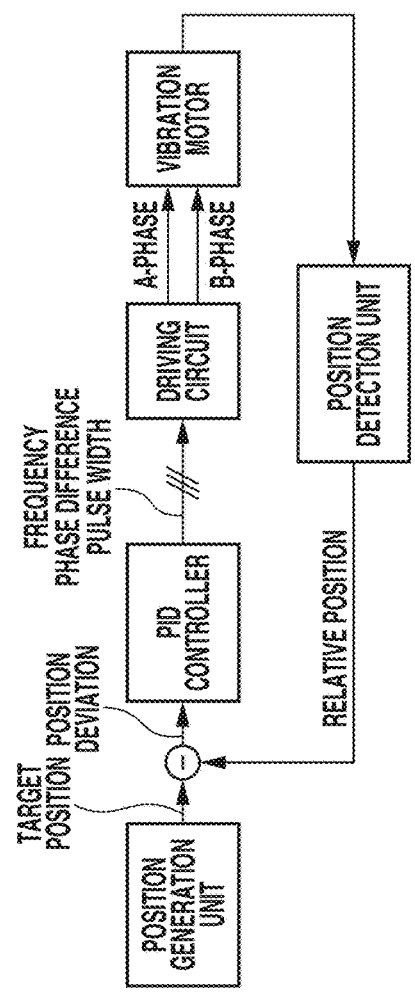
Figure 13D:
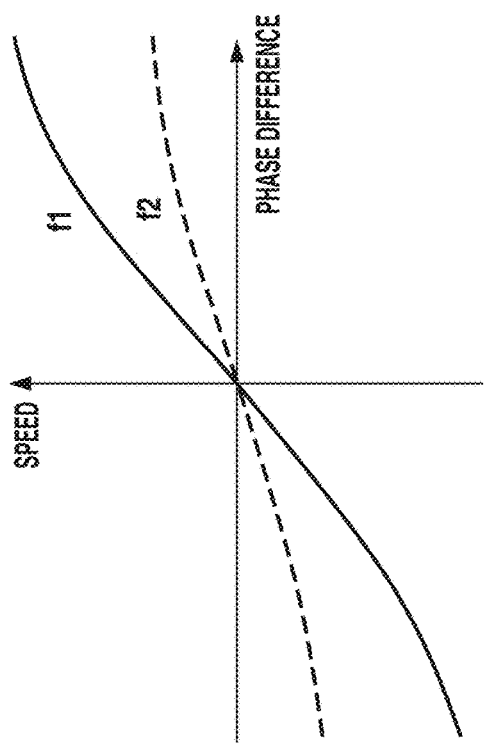
Figure 13C:
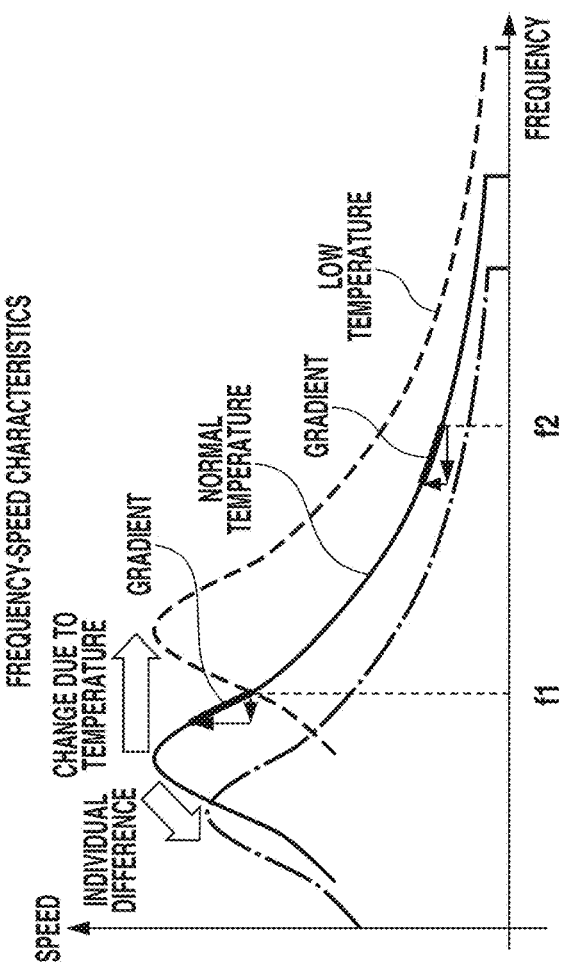

FIG. 13C is a diagram schematically illustrating the frequency-speed characteristics of the vibration motor. Specifically, FIG. 13C illustrates the state where, at a frequency (f1) in a high-speed range (a low-frequency range), the speed is high and the gradient of the frequency-speed characteristics is great. FIG. 13C also illustrates the state where, at a frequency (f2) in a low-speed range (a high-frequency range), the speed is low and the gradient of the frequency-speed characteristics is small. Control performance (the frequency-speed characteristics and the phase difference-speed characteristics) of the vibration motor differs depending on the speed range to be used. Thus, it is difficult to adjust a PID control gain.

FIG. 13D is a diagram schematically illustrating the phase difference-speed characteristics of the vibration motor. Specifically, FIG. 13D illustrates the state where, at the frequency (f1) in the high-speed range (the low-frequency range), the speed is high and the gradient of the phase difference-speed characteristics is great. FIG. 13D also illustrates the state, where at the frequency (f2) in the low-speed range (the high-frequency range), the speed is low and the gradient of the phase difference-speed characteristics is small.

As illustrated in FIGS. 13C and 13D, the frequency-speed characteristics and the phase difference-speed characteristics of the vibration actuator differ depending on the speed range to be used. Thus, the control performance of the vibration actuator changes depending on the driving frequency or the phase difference.

If the environmental temperature changes, for example, from a normal temperature to a low temperature, a resonance frequency shifts from a low-frequency side to a high-frequency side based on temperature characteristics of a piezoelectric element. In this case, the speed corresponding to the driving frequency and the gradient of the frequency-speed characteristics corresponding to the driving frequency differ before and after the resonance frequency shifts from the low-frequency side to the high-frequency side. Thus, the control performance of the vibration actuator changes also due to the environmental temperature.

The speed and the gradient differ also due to an individual difference in the vibration motor. Thus, the control performance changes also from individual to individual. The control performance changes also due to changes over time. It is advantageous to take all the change factors in account to adjust the PID control gain (proportional gain, integral gain, and derivative gain of PID control) and design the vibration actuator to ensure a gain margin and a phase margin.

Thus, a vibration actuator control apparatus including, as a main control amount output unit, a control amount output unit different from that of a conventional PID controller has been desired.

Figure 1:
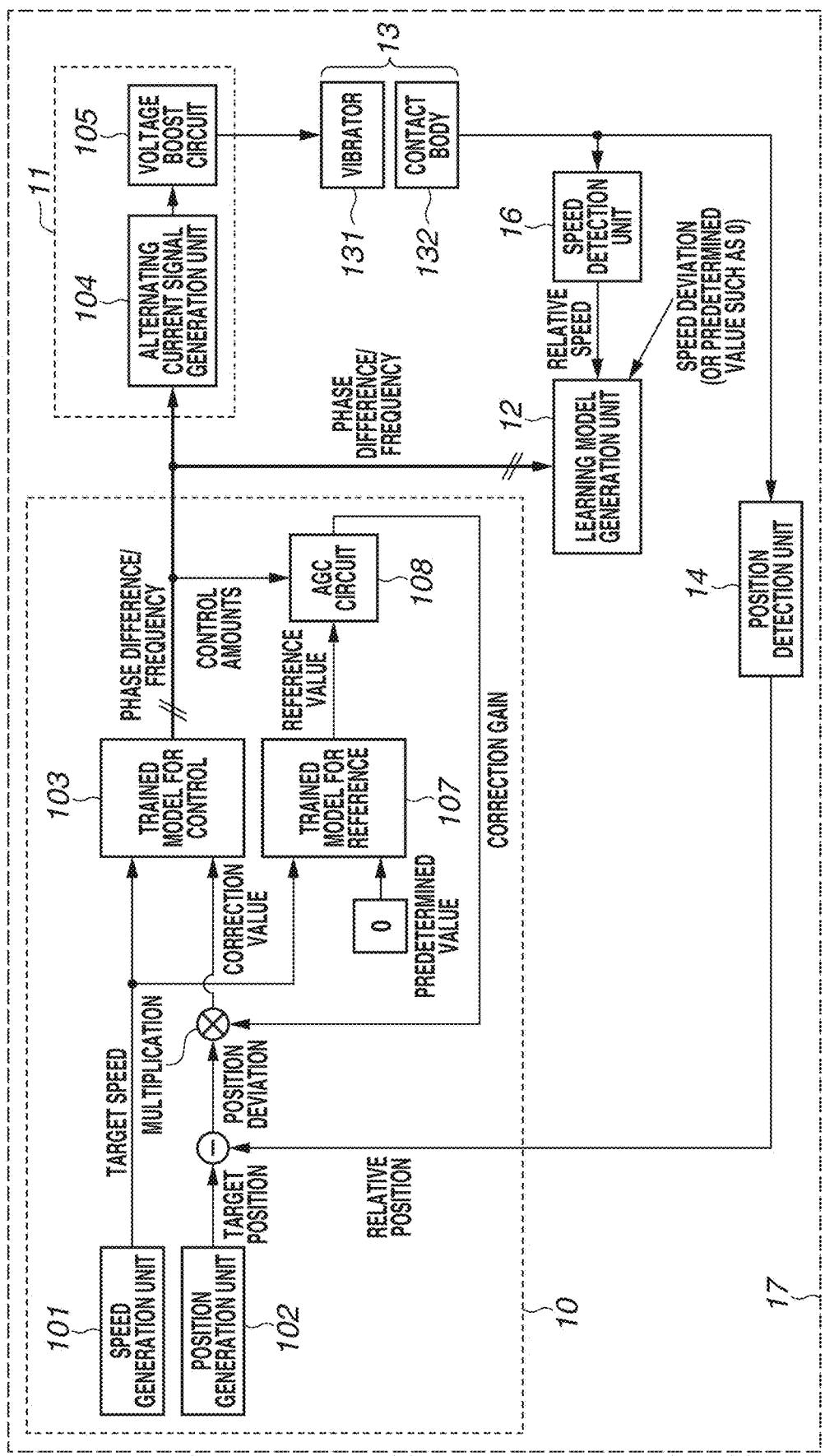
FIG. 1 is a diagram (a control block diagram) illustrating a vibration driving apparatus according to a first exemplary embodiment of the present disclosure.

FIG. 1 is a diagram (a control block diagram) illustrating a vibration driving apparatus according to a first exemplary embodiment of the present disclosure.

A vibration driving apparatus 17 includes a control unit 10 that controls a vibration motor 13 (a vibration actuator), a learning model generation unit 12, and a driving unit 11. The vibration driving apparatus 17 also includes the vibration motor 13 (the vibration actuator) including a vibrator 131 and a contact body 132, and a position detection unit 14 that detects a relative position (a detection position) of the vibrator 131 and the contact body 132. The vibration driving apparatus 17 also includes a speed detection unit 16 that detects a relative speed (a detection speed) of the vibrator 131 and the contact body 132. In FIG. 1, a control apparatus 15 is constituted of the vibration driving apparatus 17 excluding the vibration motor 13 that is a control target.

The control unit 10 is configured to generate signals that control driving of the vibrator 131 by automatic gain control (hereinafter, AGC). Specifically, a target speed of the vibration motor 13 and a correction value of a position deviation (a value based on a target deviation) are input to a control amount output unit 103 including a trained model for control, and a phase difference and a frequency that are output from the control amount output unit 103 including the trained model for control are used as control amounts. A pulse width for changing a voltage amplitude may also be used as a control amount.

The control unit 10 includes a speed generation unit 101 (a speed indication unit), a position generation unit 102 (a position indication unit), the control amount output unit 103 including the trained model for control, a control amount output unit 107 including a trained model for reference, and an AGC circuit 108. The driving unit 11 includes an alternating current signal generation unit 104 and a voltage boost circuit 105.

The speed generation unit 101 (the speed indication unit) generates a target speed of a relative speed (a detection speed) of the vibrator 131 and the contact body 132 with respect to each time. The position generation unit 102 (the position indication unit) generates a target position of a relative position (a detection position) of the vibrator 131 and the contact body 132 with respect to each time, and a difference (a value based on the difference) between the relative position (the detection position) detected by the position detection unit 14 and the target position is calculated as a position deviation (a first value).

For example, as each of the target speed and the target position, a single indication value is output from each generation unit (each indication unit) every control sampling period. The control sampling period refers to a single cycle from the acquisition of the position deviation (the first value) to immediately before the next start of the acquisition of the position deviation (the first value) through the output of control amounts, the input of alternating current signals to the vibrator 131, and the detection of the relative speed (the detection speed) and the relative position (the detection position) of the vibrator 131 and the contact body 132, in FIG. 1. In the above cycle, the position or the speed of the vibration motor 13 is subjected to feedback control.

The target speed is a speed applied to the vibration motor 13 so that the vibration motor 13 follows a predetermined position, and may be generated by differentiating the target position with respect to each time. Conversely, the target position may be generated by integrating the target speed.

The AGC circuit 108, which is a feature of some embodiments of the present disclosure, is described in detail.

The target speed and a correction value (a value based on the target position) of the position deviation (the first value) are input to the control amount output unit 103 including the trained model for control, and a phase difference and a frequency are output from the control amount output unit 103 including the trained model for control. On the other hand, the target speed and a predetermined value (zero) are input to the control amount output unit 107 including the trained model for reference, and a reference value of the phase difference is output from the control amount output unit 107 including the trained model for reference. Thus, "the phase difference as a control amount" and "the phase difference as a reference value" are input to the AGC circuit 108.

Since the control amount output unit 107 including the trained model for reference calculates two reference values (the phase difference and the frequency), a configuration may be employed in which the reference value of the frequency is used in AGC. Alternatively, both the phase difference and the frequency may be used as reference values. Each control amount and the reference value are input to the AGC circuit 108, and a correction gain (a second value) is output from the AGC circuit 108. The correction gain (the second value) indicates a relative ratio of the control amount to be used in actual driving to the reference value resulting from learning in advance.

Figure 9:
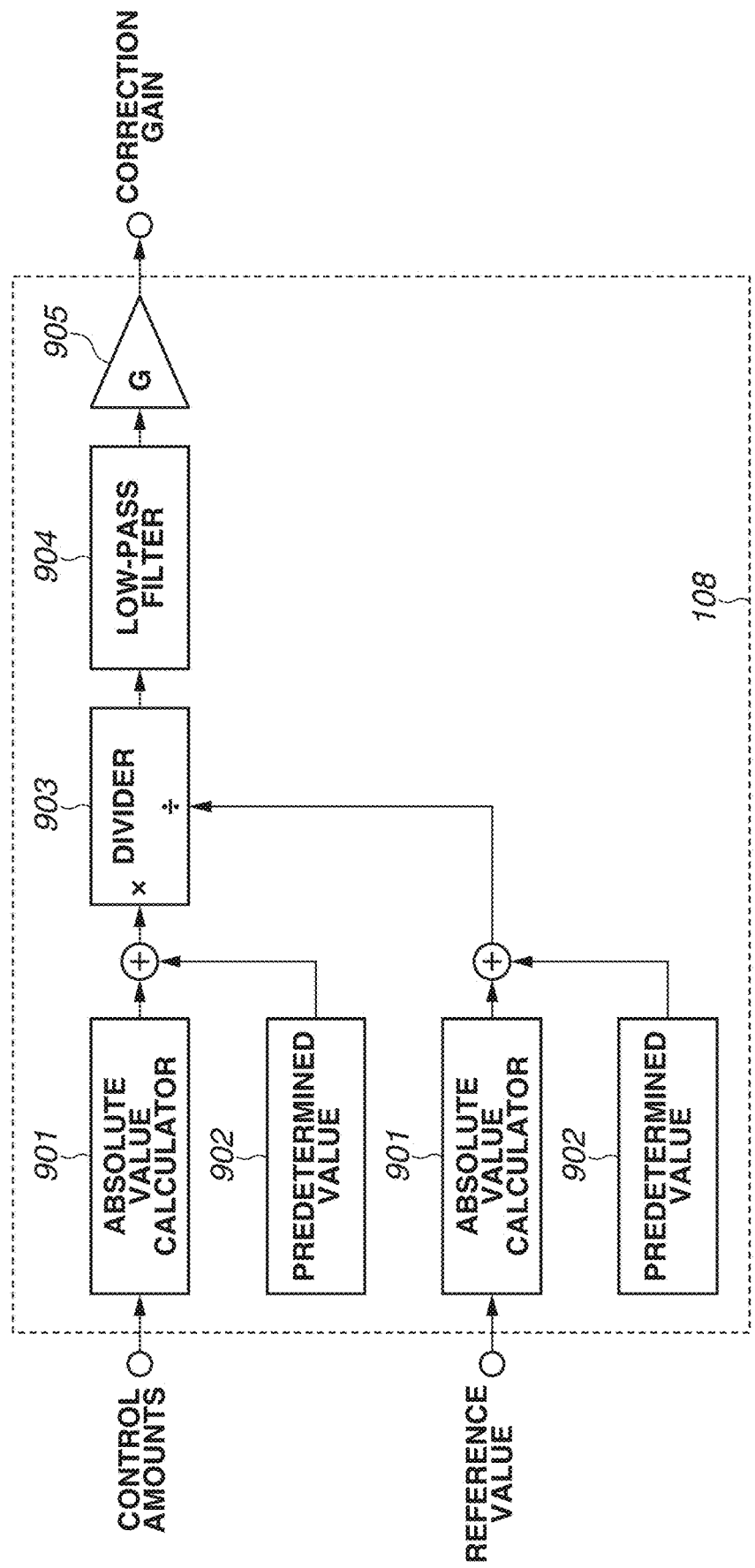
FIG. 9 is a block diagram of an automatic gain control (AGC) circuit according to the first exemplary embodiment of the present disclosure.

FIG. 9 is a block diagram of the AGC circuit 108 according to the first exemplary embodiment of the present disclosure.

After the control amount and the reference value are subjected to calculation by respective absolute value calculators 901, predetermined values 902 for preventing division by zero are added to the control amount and the reference value. Then, a divider 903 calculates a relative ratio of the control amount to the reference value. The relative ratio is processed by a low-pass filter 904 to remove a noise component, amplified by a predetermined setting gain 905, and then output as the correction gain (the second value). The setting gain 905 is a gain as a reference set to control the vibration motor 13 stably and accurately with parameters of a neural network (hereinafter referred to as NN) obtained when learning is performed.

In the AGC circuit 108, for example, if the speed characteristics of the vibration motor 13 decrease compared to when the learning is performed due to changes in the phase difference-speed characteristics from a solid line to a dotted line in FIG. 13D, the same speed cannot be obtained unless the control amount is made greater than when the learning is performed. Thus, in this case, the increased correction gain (second value) is output. Conversely, if the speed characteristics of the vibration motor 13 increase compared to when the learning is performed due to the changes in the phase difference-speed characteristics from the dotted line to the solid line in FIG. 13D, the same speed can be obtained even if the control amount is made smaller than when the learning is performed. Thus, in this case, the decreased correction gain (second value) is output.

Thus, a correction value obtained by multiplying the position deviation (the first value) and the correction gain (the second value) calculated during the driving (a value based on the target position or a value based on a product of the first and second values) is input to the control amount output unit 103 including the trained model for control. This can compensate for the speed characteristics of the vibration motor 13. As a result, even if the driving condition or the temperature environment changes, the control amounts are automatically corrected by the automatic gain control. Thus, it is possible to obtain highly accurate and robust controllability.

The operation of the AGC circuit according to the first exemplary embodiment of the present disclosure is specifically described using results of control by an actual apparatus.

FIGS. 14A, 14B, and 14C illustrate the results of the control apparatus according to the present exemplary embodiment performing feedback control of the vibration motor in a predetermined target position pattern.

In the pattern, a reciprocating movement at a stroke of 12 mm including a positioning operation is performed in a trapezoidal drive with the target speed at a maximum of 150 mm/s. The horizontal axis represents time (sec), and the vertical axes represent the target position (the number of encoder pulses: 8000 pulses per millimeter) on the left axis and the position deviation (the first value) in units of μm on the right axis.

FIG. 14A illustrates the result of control at a starting frequency of 91 kHz. FIG. 14B illustrates the result of control at a starting frequency of 93 kHz. FIG. 14C illustrates the result of control at a starting frequency of 95 kHz. Measurements were made with a configuration in exemplary embodiments described below in which a proportional-integral-derivative (PID) controller is connected in parallel. The control amounts were the phase difference and the frequency. A trained model was generated using measurement data obtained by the control at the starting frequency of 93 kHz. The position deviation (the first value) tends to be large in an acceleration/deceleration area. This is because an error occurs between the control amounts output from the trained model and the actual control amounts under the influence of inertia of a non-driven body.

The lower three diagrams correspond to the upper diagrams and are log outputs of the correction gain (the second value) output from the AGC circuit 108 during the control. The horizontal axis represents time (sec), and the vertical axis represents the correction gain (the second value). For example, if the control amounts output from the trained model and the actual control amounts completely match each other, 1 is output as the correction gain (the second value). In the case of the starting frequency of 91 kHz in FIG. 14A, the starting frequency is closer to a resonance frequency than when the learning is performed. Thus, the speed characteristics of the vibration motor 13 increase, and the same speed is obtained with the control amounts smaller than that when the learning is performed. Thus, as illustrated in FIG. 14A, the correction gain (the second value) decreases to near 0.6 in the acceleration/deceleration area, and the vibration motor 13 operates in the direction of substantially decreasing the gain related to the position deviation (the first value). In the case of the starting frequency of 95 kHz in FIG. 14C, the starting frequency is further away from the resonance frequency than when the learning is performed. Thus, the speed characteristics of the vibration motor 13 decrease, and the same speed is not obtained unless the control amounts are greater than those when the learning is performed. Thus, as illustrated in FIG. 14C, the correction gain (the second value) increases to near 1.6 in the acceleration/deceleration area, and the vibration motor 13 operates in the direction of substantially increasing the gain related to the position deviation (the first value).

As described above, the control amounts are automatically corrected by automatic gain control depending on changes in the characteristics of the vibration motor 13. Thus, it is possible to reduce the position deviation (the first value) during the driving. This can improve controllability.

FIG. 15 illustrates results indicating robustness of the control apparatus according to the first exemplary embodiment of the present disclosure.

FIG. 15 illustrates results of performing a positioning operation in a trapezoidal drive at a maximum speed of 150 mm/s and calculating the position deviation (the first value) during a reciprocating movement at a stroke of 12 mm with 36. The horizontal axis represents the starting frequency, and the vertical axis represents the position deviation (the first value). Comparative example 1 is the result of conventional PID control. Compared to comparative example 1, the position deviation (the first value) is significantly improved in the control based on the trained model using automatic gain control according to the present disclosure. It is understood that even if the starting frequency is changed, a fluctuation in the position deviation (the first value) is small, and the robustness is improved.

Comparative example 2 is the result of control using a neural network with automatic gain control turned off. While there is no great difference from the present disclosure at the starting frequency of 93 kHz, the position deviation (the first value) is large at the starting frequency of 95 kHz, which indicates the effect of the present disclosure. As described above, if control is performed at different starting frequencies, the gradient of the speed changes due to the non-linear characteristics of the vibration motor 13. Thus, it has been difficult to handle this by the conventional PID control. In the present disclosure, the control amounts are automatically corrected by automatic gain control. Thus, it is possible to obtain excellent controllability at different starting frequencies.

A description is given below of the configuration and the learning method of a learning model used in the present disclosure, and a control method for controlling the vibration motor using the trained model.

Figure 4A:
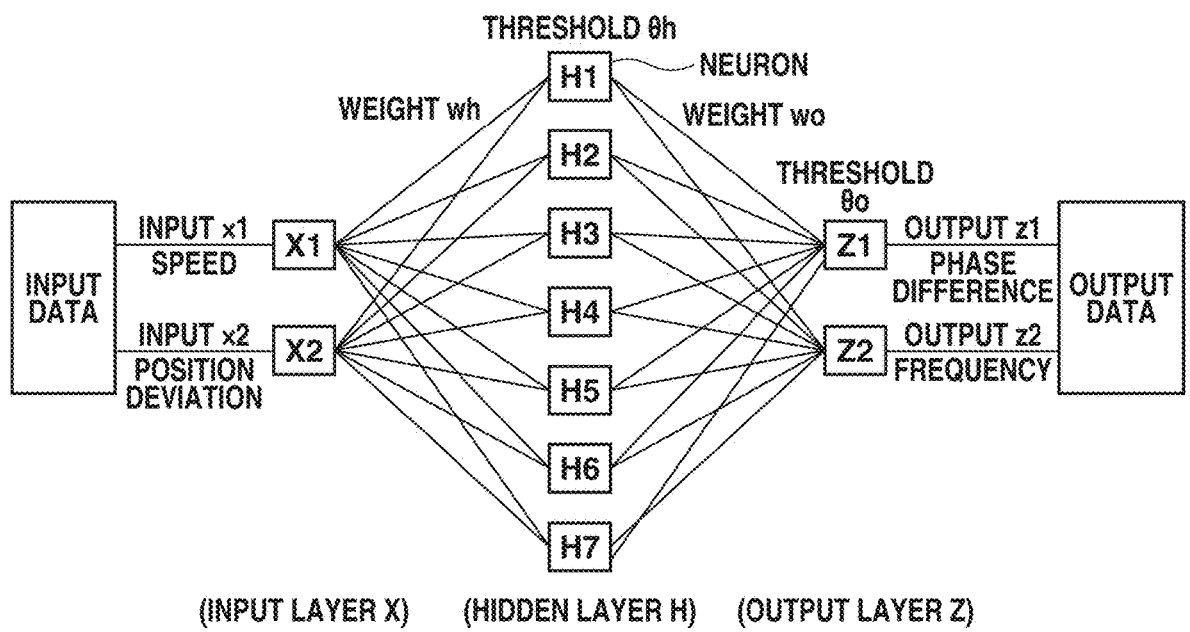
FIGS. 4A, 4B, and 4C are diagrams illustrating a neural network configuration included in a learning model according to the first exemplary embodiment of the present disclosure.
Figure 4B:
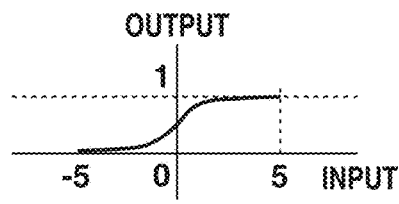
Figure 4C:
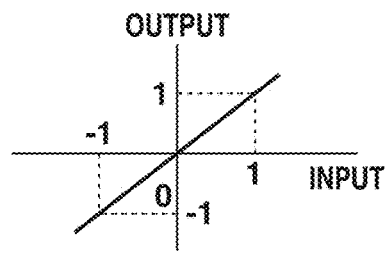

FIGS. 4A, 4B, and 4C are diagrams illustrating a neural network configuration included in a learning model according to the first exemplary embodiment of the present disclosure.

The control amount output unit 103 including the trained model for control and the control amount output unit 107 including the trained model for reference each include an NN described below. The NN is composed of an X-layer, which is an input layer, an H-layer, which is a hidden layer, and a Z-layer, which is an output layer. In the first exemplary embodiment of the present disclosure, as input data, the target speed is set to x1, and the position deviation (the first value) is set to x2. As output data, the phase difference is set to z1, and the frequency is set to z2. The hidden layer is formed of seven neurons and uses a general sigmoid function (FIG. 4B) as an activation function. The number of neurons of the hidden layer may be other than seven, and it is desirable that the number of neurons be in a range of 3 to 20, for example. The smaller the number of neurons is, the lower the accuracy is. However, the learning quickly comes to an end. The greater the number of neurons is, the higher the accuracy is. However, the learning is slow. Generally, the output layer uses a sigmoid function or Rectified Linear Unit (ReLU) (a ramp function) as the activation function. However, to handle the minus sign of the phase difference that is the control amount, the output layer uses a linear function (FIG. 4C). A weight connecting each neuron of the input layer and each neuron of the hidden layer is indicated by wh. A threshold for the neurons of the hidden layer is indicated by θh. A weight connecting each neuron of the hidden layer and each neuron of the output layer is indicated by wo. A threshold for the neurons of the output layer is indicated by θo. As all the weights and the thresholds, values learned by the below-described learning model generation unit 12 as a machine learning unit are applied. The trained NN can be regarded as an aggregate obtained by extracting a common feature pattern from time series data on the speed of the vibration motor 13 and the control amounts. The outputs of the trained NN are values obtained by the function in which the weights and the thresholds are variables.

The control amounts (the phase difference and the frequency) output from the control amount output unit 103 including the trained model for control are input to the alternating current signal generation unit 104, and the speed and the driving direction of the vibration motor 13 are controlled. Based on the phase difference, the frequency, and the pulse width, the alternating current signal generation unit 104 generates alternating current signals in two phases. For example, the voltage boost circuit 105 includes a coil and a transformer, and the alternating current signals boosted to desired driving voltages by the voltage boost circuit 105 are applied to a piezoelectric element of the vibrator 131 and drive the contact body 132.

With reference to the drawings, a description is given of an example of the vibration motor that can be applied to the present disclosure. The vibration motor according to the first exemplary embodiment of the present disclosure includes a vibrator and a contact body.

FIGS. 2A, 2B, 2C, and 2D are diagrams illustrating the driving principle of a linear driving vibration motor 13 as an example of the vibration motor.

Figure 2A:
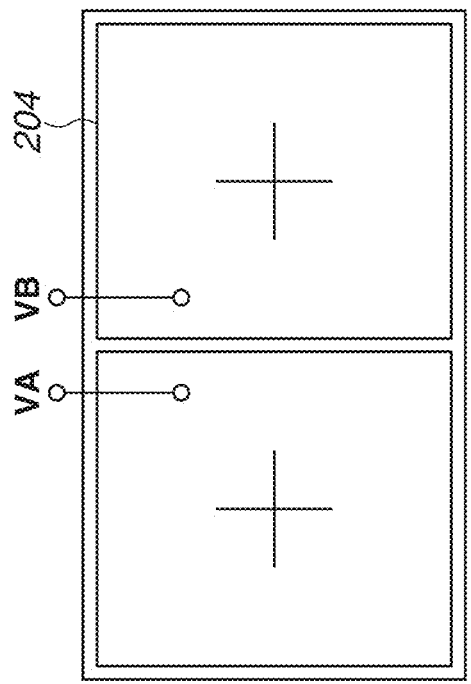
FIGS. 2A, 2B, 2C, and 2D are diagrams illustrating a driving principle of a linear driving vibration motor.

The vibration motor 13 illustrated in FIG. 2A includes the vibrator 131 including an elastic body 203, and a piezoelectric element 204 that is an electro-mechanical energy conversion element bonded to the elastic body 203, and the contact body 132 that is driven by the vibrator 131. Alternating-current voltages are applied to the piezoelectric element 204, thereby causing two vibration modes as illustrated in FIGS. 2C and 2D to occur and moving the contact body 132 in pressure contact with projection portions 202 in the directions of arrows.

Figure 2B:
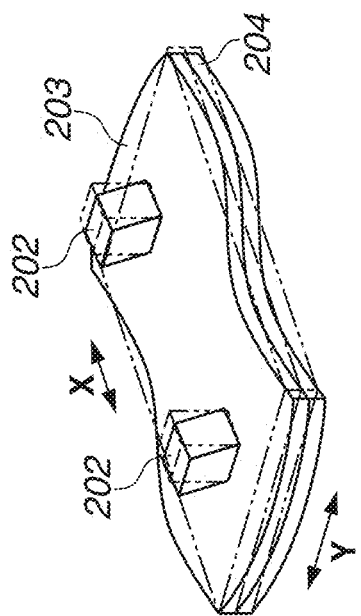
Figure 2C:
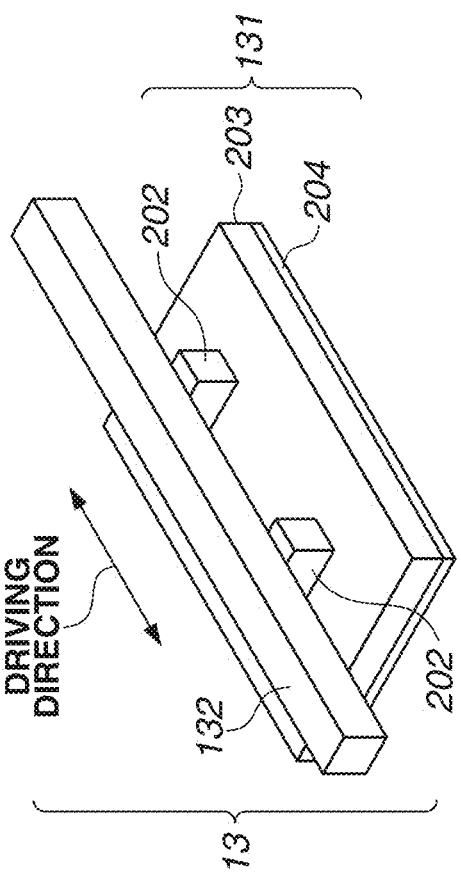
Figure 2D:
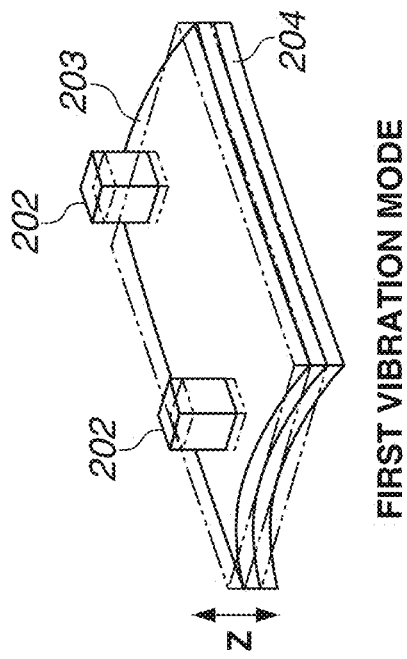

FIG. 2B is a diagram illustrating an electrode pattern of the piezoelectric element 204. For example, the piezoelectric element 204 of the vibrator 131 is divided into two equal electrode regions in the longitudinal direction. The polarization directions of the electrode regions are the same direction (+). To the electrode region located on the right side of FIG. 2B of the two electrode regions of the piezoelectric element 204, an alternating-current voltage (VB) is applied. To the electrode region located on the left side thereof, an alternating-current voltage (VA) is applied.

If the alternating-current voltages VB and VA are alternating-current voltages having frequencies near a resonance frequency in a first vibration mode and having the same phase, the entirety of the piezoelectric element 204 (the two electrode regions) expands at a certain moment and contracts at another moment. As a result of this, a vibration in the first vibration mode illustrated in FIG. 2C (hereinafter, a thrust vibration) is generated in the vibrator 131. Consequently, the projection portions 202 are displaced in a thrust direction (a Z-direction).

If the alternating-current voltages VB and VA are alternating-current voltages having frequencies near a resonance frequency in a second vibration mode and having phases shifted by 180° from each other, the electrode region on the right side of the piezoelectric element 204 contracts and the electrode region on the left side expands at a certain moment. At another moment, the relationship between contraction and expansion is reversed. As a result of this, a vibration in the second vibration mode illustrated in FIG. 2D (hereinafter, a sending vibration) is generated in the vibrator 131. Consequently, the projection portions 202 are displaced in a driving direction (a sending direction or an X-direction).

Thus, the alternating-current voltages having frequencies near the resonance frequencies in the first and second vibration modes are applied to the electrode regions of the piezoelectric element 204, whereby it is possible to excite a vibration obtained by combining the first and second vibration modes.

As described above, the two vibration modes are combined together, whereby the projection portions 202 make elliptical motions in a cross section perpendicular to a Y-direction (a direction perpendicular to the X-direction and the Z-direction) in FIG. 2D. The elliptical motions drive the contact body 132 in the direction of an arrow in FIG. 2A. The direction in which the contact body 132 and the vibrator 131 move relative to each other, i.e., the direction in which the contact body 132 is driven by the vibrator 131 (the X-direction in this case), is referred to as the driving direction.

An amplitude ratio R of the second vibration mode to the first vibration mode (the amplitude of the sending vibration/the amplitude of the thrust vibration) can be changed by changing the phase difference between the alternating-current voltages in the two phases to be input to the electrode regions, which are two equal regions. In the vibration motor 13, the amplitude ratio between the vibrations is changed, whereby it is possible to change the speed of the contact body 132.

The above description has been given using a case where the vibrator 131 is at rest and the contact body 132 moves as an example. The present disclosure, however, is not limited to this configuration. The positions of contact portions of the contact body 132 and the vibrator 131 only need to change relative to each other. For example, the contact body 132 may be fixed and the vibrator 131 may move. In other words, in the present disclosure, "driving" means changing the relative position of the contact body and the vibrator, and does not require a change in the position of the contact body (e.g., the position of the contact body relative to the position of a housing containing the contact body and the vibrator).

For example, the vibration motor is used to drive an autofocus of a camera.

Figure 3:
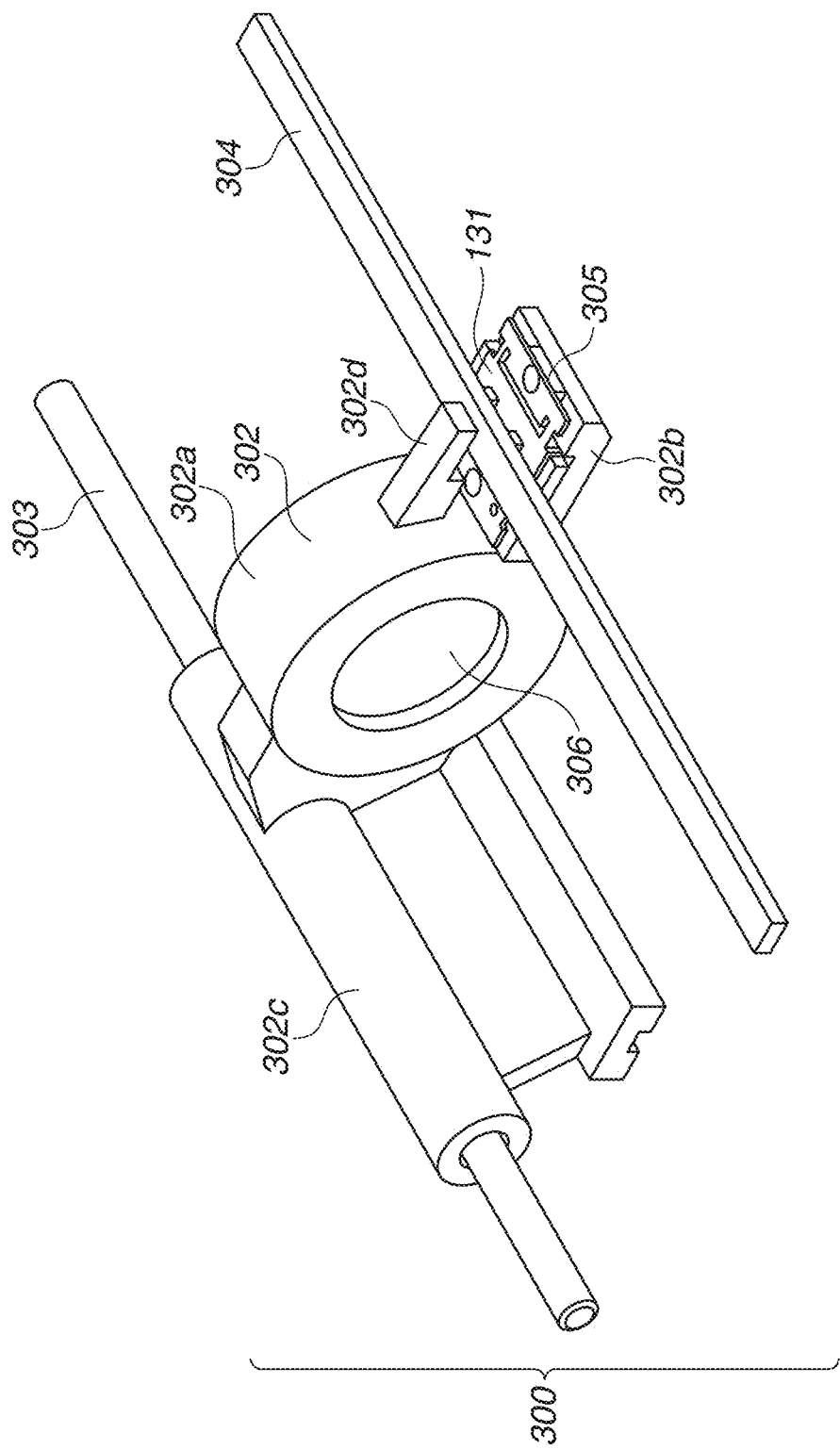
FIG. 3 is a diagram illustrating a lens driving mechanism unit for a lens barrel.

FIG. 3 is a diagram illustrating a lens driving mechanism for a lens barrel according to the first exemplary embodiment of the present disclosure.

A lens holder driving mechanism using the vibration motor includes a vibrator, a lens holder, and a first guide bar and a second guide bar disposed parallel to each other and slidably holding the lens holder. In the first exemplary embodiment of the present disclosure, a case is described where the second guide bar is a contact body, the second guide bar is fixed, and the vibrator and the lens holder integrally move.

By elliptical motions of projection portions of the vibrator generated by application of driving voltages to an electro-mechanical energy conversion element, the vibrator generates a relative movement force between the vibrator and the second guide bar in contact with the projection portions of an elastic body. This configuration enables the lens holder integrally fixed to the vibrator to move in the first and second guide bars.

Specifically, a contact body driving mechanism 300 mainly includes a lens holder 302 as a lens holding member, a lens 306, the vibrator 131 to which a flexible printed circuit board is connected, a pressure magnet 305, two guide bars 303 and 304, and a base (not illustrated). A description is given using the vibrator 131 as an example of the vibrator.

Both ends of each of the first guide bar 303 and the second guide bar 304 are held and fixed by the base (not illustrated) so that the first guide bar 303 and the second guide bar 304 are placed parallel to each other. The lens holder 302 includes a cylindrical holder portion 302a, a holding portion 302b that holds and fixes the vibrator 131 and the pressure magnet 305, and a first guide portion 302c that acts as a guide by the first guide bar 303 fitting into the first guide portion 302c.

The pressure magnet 305 constituting a pressurization unit includes a permanent magnet and two yokes placed at both ends of the permanent magnet. A magnetic circuit is formed between the pressure magnet 305 and the second guide bar 304, and an attractive force is generated between these members. The pressure magnet 305 and the second guide bar 304 are placed at a distance from each other, and the second guide bar 304 is placed in contact with the vibrator 131.

By the above attractive force, a pressure force is applied between the second guide bar 304 and the vibrator 131. Two projection portions of an elastic body come into pressure contact with the second guide bar 304, thereby forming a second guide portion. The second guide portion forms a guide mechanism using the magnetic attractive force. The second guide portion receives an external force, so that a state where the vibrator 131 and the second guide bar 304 are pulled away from each other is caused. The state is handled as follows.

Specifically, a measure is taken so that a coming-off prevention portion 302d provided in the lens holder 302 comes into contact with the second guide bar 304, thereby the lens holder 302 returns to a desired position.

Desired alternating-current voltage signals are applied to the vibrator 131, thereby a driving force is generated between the vibrator 131 and the second guide bar 304. The driving force drives the lens holder 302.

A position sensor (not illustrated) attached to the contact body 132 or the vibrator 131 detects the relative position (the detection position) and the relative speed (the detection speed) of the vibrator 131 and the contact body 132. The relative position (the detection position) is fed back as the position deviation (the first value) to the trained model control unit 10 (the control unit), thereby feedback control is performed on the vibration motor 13 to follow the target position with respect to each time. The relative speed (the detection speed) is input to the learning model generation unit 12 as the machine learning unit and used together with the control amounts as learning data.

The first exemplary embodiment of the present disclosure is described using, as an example, a two-phase driving control apparatus that drives a piezoelectric element that is an electro-mechanical energy conversion element separately in two phases. The present disclosure, however, is not limited to the two-phase driving control apparatus, and can also be applied to a vibration motor having two or more phases.

Next, the learning model generation unit 12 is described.

The learning model is generated using the NN (see FIGS. 4A, 4B, and 4C) to which the relative speed (the detection speed) from the speed detection unit 16 (the speed detection unit) and a speed deviation are input and from which a phase difference and a frequency are output. The speed deviation is the deviation between the target speed and the relative speed (the detection speed). Instead of the speed deviation, zero may be input as a target deviation. An offset value may be applied to compensate for mechanical backlash. The control amounts (the phase difference and the frequency) output from the control amount output unit 103 including the trained model for control are used as correct answer data and compared with control amounts output from the NN to which the relative speed (the detection speed) and the speed deviation are input, thereby an error is calculated. In this example, the phase difference and the frequency are used as the control amounts. Alternatively, a combination of the pulse width and the frequency and a combination of the pulse width and the phase difference can also be applied. The number of neurons of the output layer of the NN may be one, and any of the phase difference, the frequency, and the pulse width may be selected as the control amounts.

Figure 5:
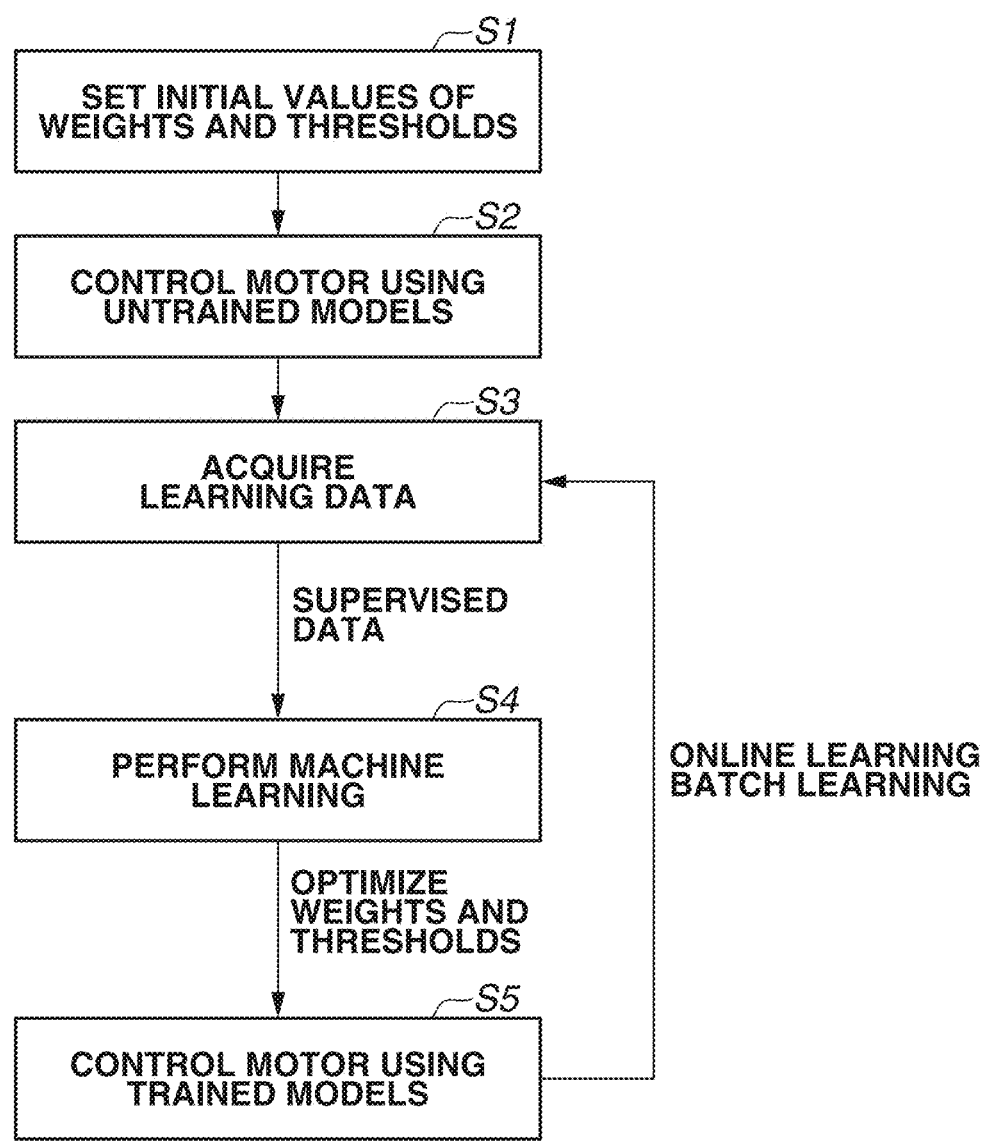
FIG. 5 illustrates a flowchart for control by machine learning and a trained model according to the first exemplary embodiment of the present disclosure.

FIG. 5 illustrates a flowchart for control by machine learning and the trained model according to the first exemplary embodiment of the present disclosure.

In step S1, the weights and the thresholds of the control amount output unit 103 including the trained model for control and the control amount output unit 107 including the trained model for reference are set to initial values. While the initial values are set based on a random function (an untrained state), parameters learned in advance may be used.

In step S2, the vibration motor 13 is controlled using the above untrained models.

In step S3, time series data on the control amounts output from the control amount output unit 103 including the trained model for control during the driving of the vibration motor 13 and the relative speed (the detection speed) and the speed deviation that are detected is acquired as the learning data.

In step S4, optimization calculations of the learning models by machine learning are performed using the control amounts of the learning data as correct answer data. The weights and the thresholds of the NN are optimized by the machine learning, and the parameters of the control amount output unit 103 including the trained model for control and the control amount output unit 107 including the trained model for reference are updated.

In step S5, the vibration motor 13 is controlled by automatic gain control using the trained models in which the weights and the thresholds are updated. After the control, to handle a change in the driving condition or the temperature environment, the processing returns to step S3. In step S3, learning data is acquired. As a method for acquiring the learning data, batch learning in which learning is performed during suspension of the driving or online learning in which learning is sequentially performed during the driving is performed.

FIGS. 8A and 8B are timing charts illustrating the batch learning and the online learning in the machine learning unit.

The horizontal axis represents time, and the vertical axis represents a target position pattern applied as an indication value to perform feedback control of the vibration motor 13. FIG. 8A illustrates an example of the batch learning in which learning is performed during suspension of the driving. Time series data on the speed and the control amounts detected in a driving period of the vibration motor 13 is acquired as learning data, and the machine learning and the update of the parameters (the weights and the thresholds) of the NN are performed using a stop period.

The machine learning does not necessarily need to be performed every stop period. For example, a method for performing learning only in a case where a change in the temperature environment or the driving condition is detected is also possible. FIG. 8B illustrates an example of the online learning in which learning is sequentially performed during the driving. In this example, the machine learning is performed online in parallel with the driving period, and the parameters of the NN are updated during the driving period. By the application of the online learning, it is possible to handle a fluctuation in load that occurs during the driving period.

Figure 6A:
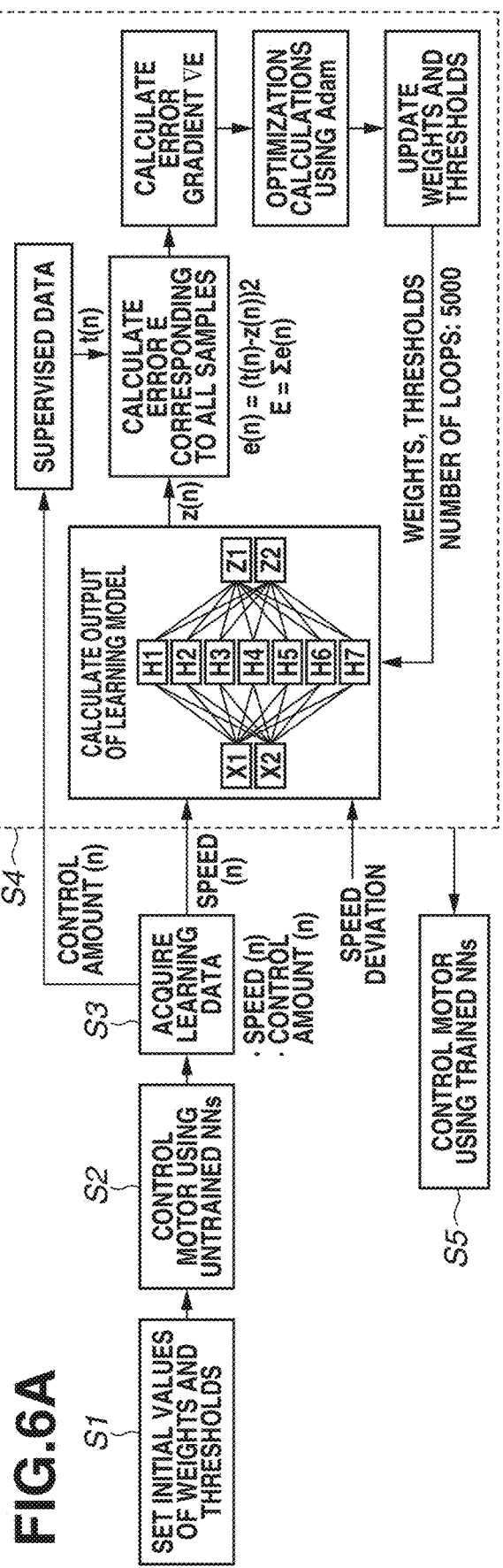
FIGS. 6A, 6B, and 6C illustrate a flowchart in a case where Adam is used as an optimization calculation technique (an optimization algorithm) for parameters of a neural network.
Figure 6C:
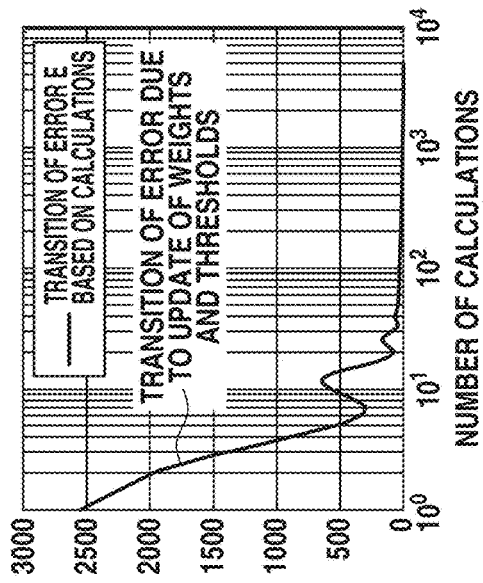
Figure 6B:
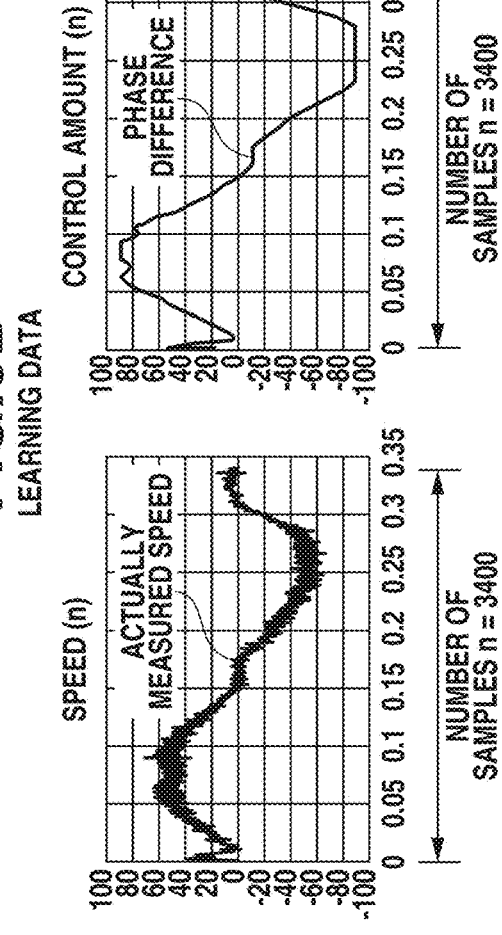

With reference to FIGS. 6A, 6B, and 6C, the machine learning in step S4 is further described.

FIG. 6A illustrates a flowchart in a case where Adaptive Moment Estimation (Adam) is used as an optimization calculation technique (an optimization algorithm) for the parameters of the NN.

Steps S1 and S2 are as described above in FIG. 5. In step S3, time series learning data illustrated in FIG. 6B is acquired. A speed (n) and a control amount (n) are measurement data in a case where control is performed using the untrained models, and the number n of samples of each of the speed and the phase difference is 3400. This is actually measured data in a case where the vibration motor 13 is driven for 0.34 seconds at a control sampling rate of 10 kHz.

The learning data does not necessarily need to be acquired at the control sampling rate. It is possible to save memory and shorten the learning time by thinning out the learning data. In the present disclosure, the speed (n) is input to each learning model, and an output z(n) of the calculation result of the speed (n) is compared with the control amount (n) of correct answer data, thereby an error e(n) is calculated. In step S4, an error E corresponding to 3400 samples is calculated in a first loop, and an error gradient $\nabla E$ of each of the weights ($w_h$ and $w_o$) and the thresholds ($\theta_h$ and $\theta_o$) is calculated. Next, using the error gradient $\nabla E$, the parameters are optimized as follows using Adam, which is one of optimization calculation techniques (optimization algorithms).

$$v_t = \beta_1 \cdot v_{t-1} + (1 - \beta_1) \cdot \nabla E \qquad \text{[Math. 1]}$$

$$s_t = \beta_2 \cdot s_{t-1} + (1 - \beta_2) \cdot \nabla E^2$$

$$w_t = w_{t-1} - \eta \cdot \frac{v_t}{\sqrt{s_t + \varepsilon}}$$

Here, $w_t$ represents the update amount of each parameter, $\nabla E$ represents the error gradient, $V_t$ represents the moving average of the error gradient, $S_t$ represents the moving average of the square of the error gradient, $\eta$ represents a learning rate, and $\varepsilon$ represents a division-by-zero prevention constant. Each parameter used q=0.001, P I=0.9, P2=0.999, and $\varepsilon$=10e-12. Every time the optimization calculations are repeated, the weights and the thresholds are updated, and the output z(n) of the learning model comes close to the control amount (n) of the correct answer data. Thus, the error E becomes smaller. FIG. 6C illustrates the transition of the error E based on the number of calculation loops. As the optimization calculation technique, another technique may be used.

Figure 7A:
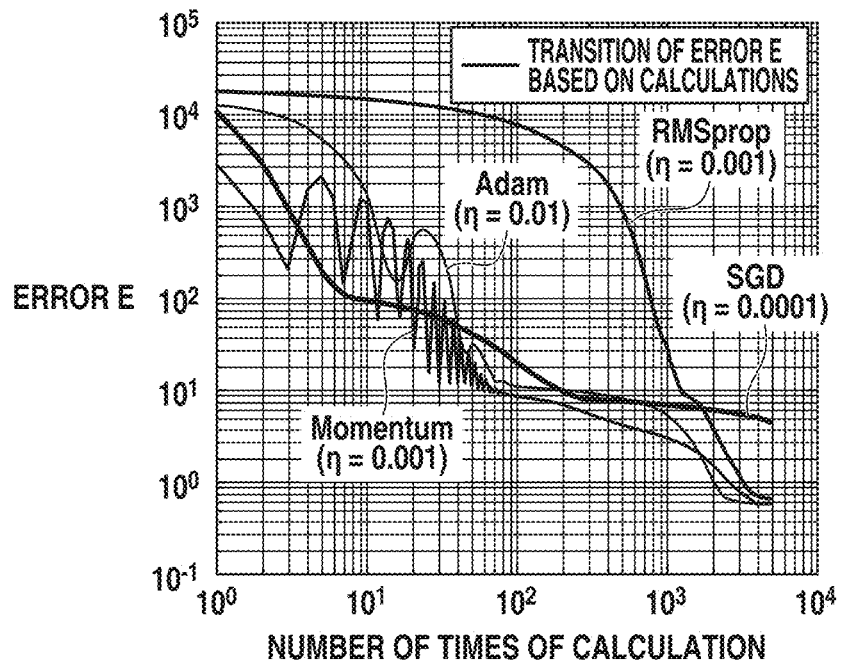
FIGS. 7A and 7B illustrate comparison between results of calculations by Adam, RMSprop, momentum, and stochastic gradient descent (SGD) using the learning model according to the first exemplary embodiment of the present disclosure and actually measured learning data.

FIG. 7A illustrates a comparison between the results of calculations by Adam, root mean squared propagation (RMSprop), momentum, and stochastic gradient descent (SGD) using the learning model according to the first exemplary embodiment of the present disclosure and actually measured learning data.

In terms of the number of calculations, stability, and a final error, the most excellent result was obtained by Adam.

Figure 7B:
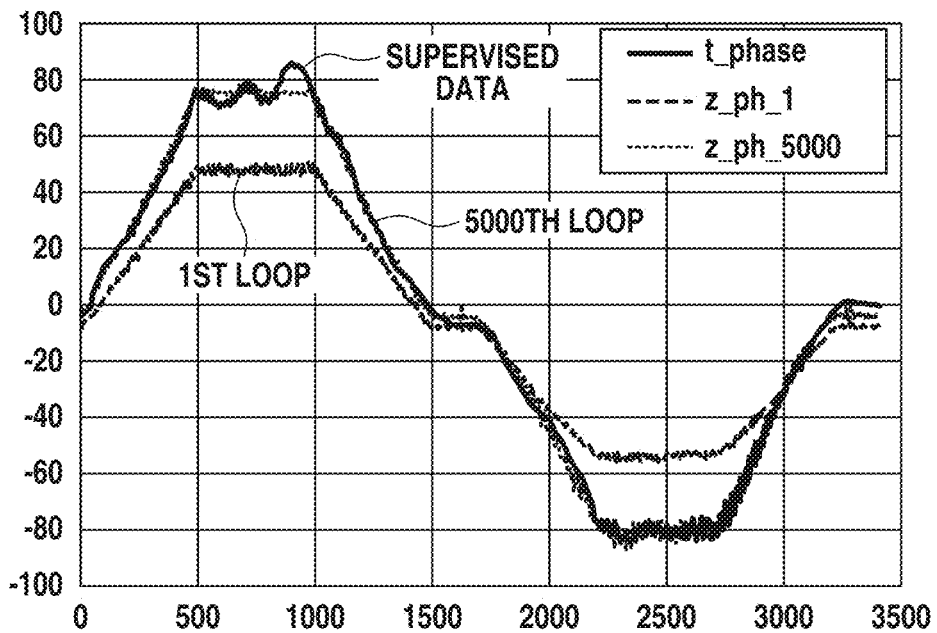

FIG. 7B is an example of the learning of the control amount (the phase difference) using Adam. It is understood that the output z of the learning model in the first loop is greatly different from correct answer data t. The calculations are repeated, and the output z of the learning model in the 5000th loop almost matches the correct answer data t. Although the optimization was performed such that the number of loops was 5000 in this example, it is desirable to appropriately adjust the number of loops based on a convergence rate. The configuration of the control apparatus according to the present disclosure has been described.

Each of the control unit 10 and the learning model generation unit 12 includes a digital device such as a processor (e.g., central processing unit (CPU)) or a programmable logic device (PLD) (including an application-specific integrated circuit (ASIC)) and an element such as an analog-to-digital (A/D) converter. Also for example, the alternating current signal generation unit 104 of the driving unit 11 includes a CPU, a function generator, and a switching circuit. And, for example, the voltage boost circuit 105 of the driving unit 11 includes a coil, a transformer, and a capacitor.

Each of the control unit 10 and the driving unit 11 may include not only a single element or a single circuit, but also a plurality of elements or a plurality of circuits. Each process may be executed by any of the elements or the circuits.

A second exemplary embodiment of the present disclosure is described.

Figure 10:
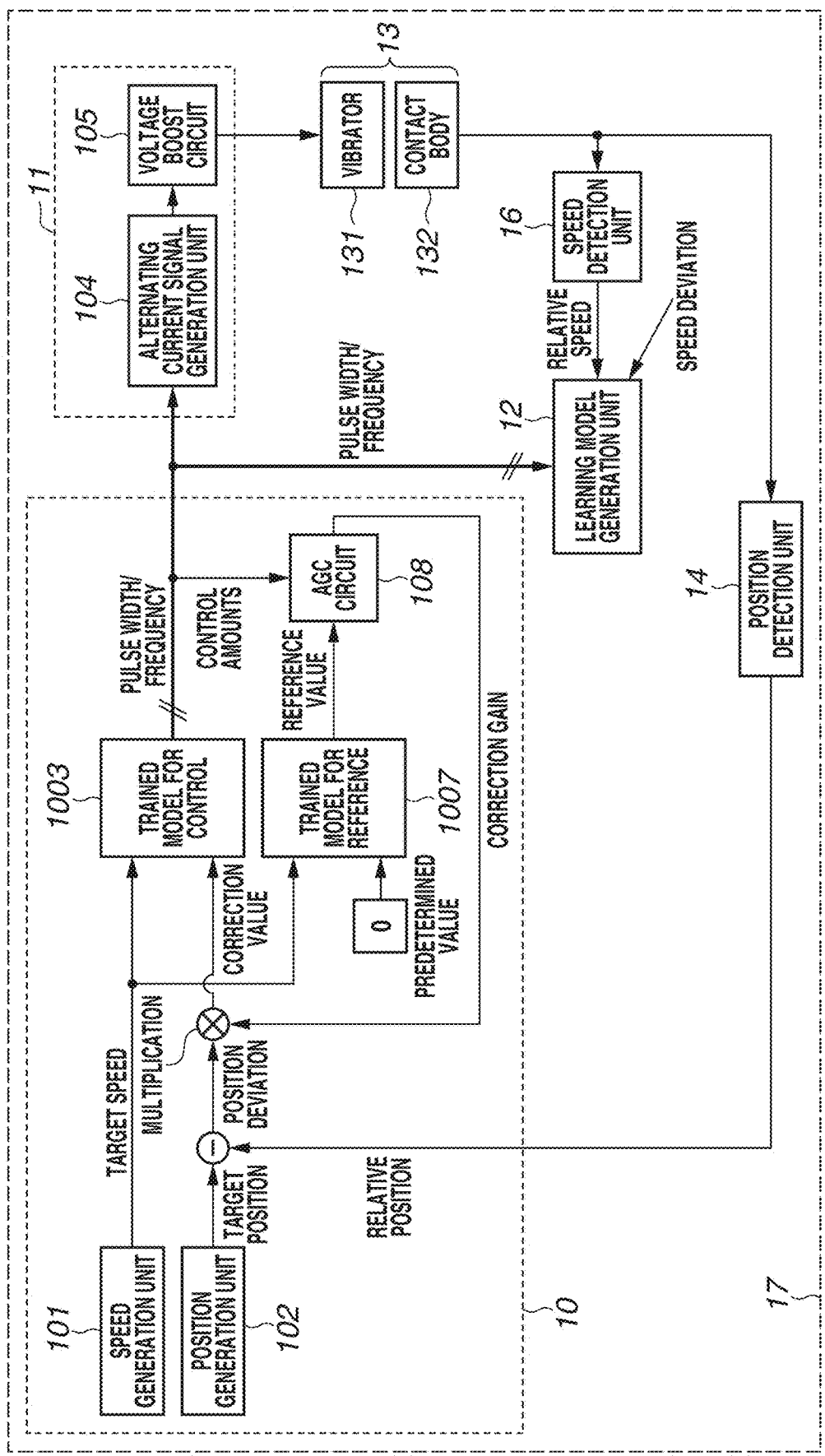
FIG. 10 is a diagram (a control block diagram) illustrating a vibration driving apparatus according to a second exemplary embodiment of the present disclosure.

FIG. 10 is a diagram (a control block diagram) illustrating a vibration driving apparatus according to the second exemplary embodiment of the present disclosure. In FIG. 10, the control apparatus 15 is constituted of the vibration driving apparatus 17 excluding the vibration motor 13 that is the control target.

In the control block diagram illustrated in FIG. 10, machine learning is performed using a pulse width and a frequency as control amounts, and control is performed using a trained model obtained by the machine learning. In the control block diagram, position feedback control of the vibration motor 13 (the vibration actuator) is performed based on a pulse width and a frequency output from a control amount output unit 1003 including a trained model for control. The learning model generation unit 12 acquires the two control amounts output from the control amount output unit 1003 including the trained model for control and the relative speed (the detection speed) detected by the speed detection unit 16 as learning data and performs the machine learning. A control amount and a reference value used in automatic gain control are pulse widths, and the control amount and reference value are input to the AGC circuit 108. Instead of the pulse widths, frequencies may be used.

With the use of the second exemplary embodiment of the present disclosure, even if the driving condition or the temperature environment changes, a pulse width and a frequency are automatically corrected by automatic gain control. Thus, it is possible to obtain highly accurate and robust controllability.

Figure 20A:
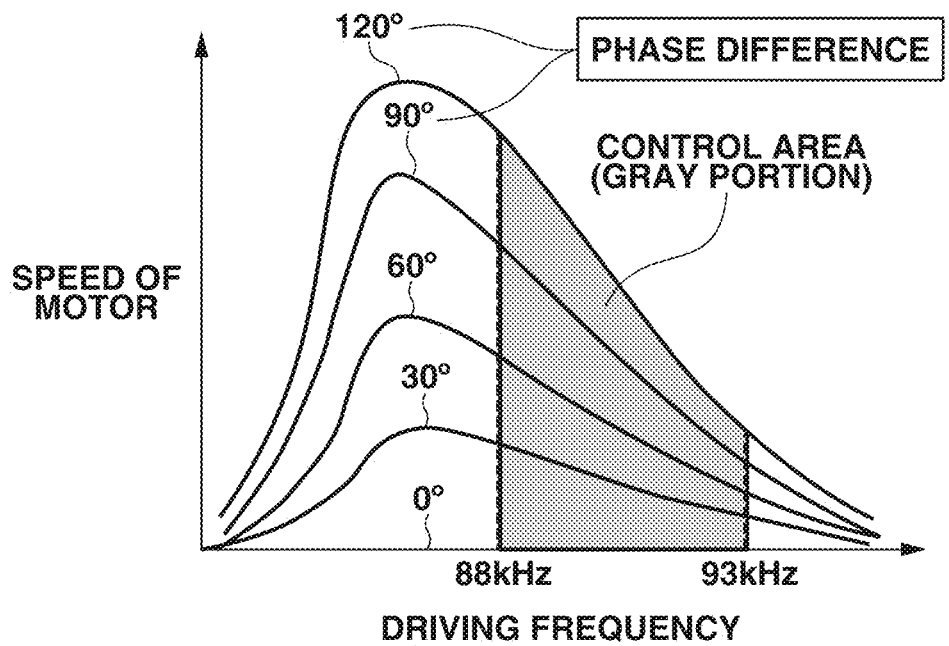
FIGS. 20A and 20B are diagrams illustrating speed characteristics of a vibration actuator based on control amounts.
Figure 20B:
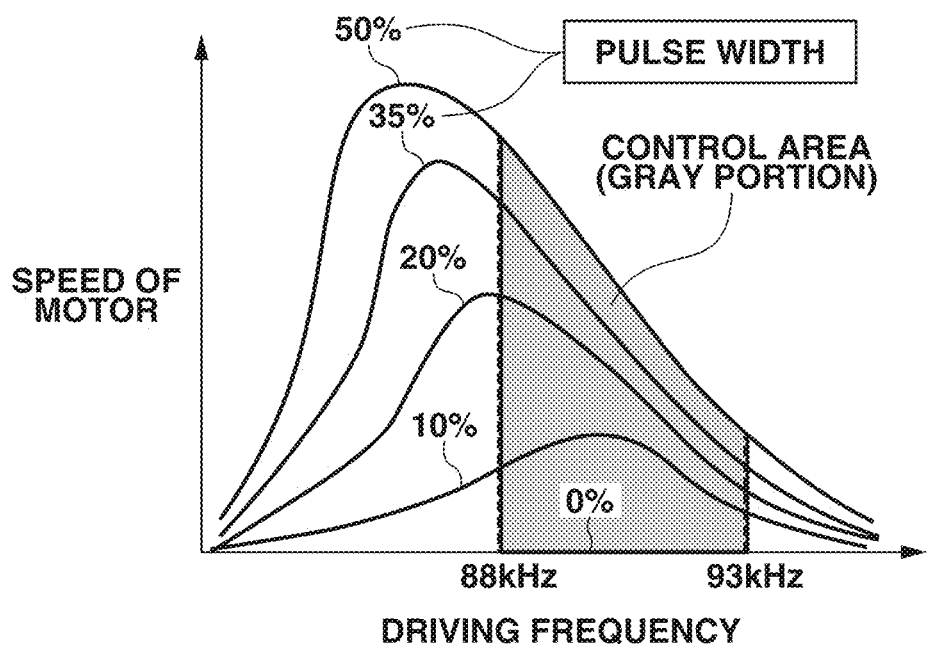

FIGS. 20A and 20B are diagrams illustrating the speed characteristics of the vibration motor based on the control amounts.

FIG. 20A illustrates a case where control is performed using the phase difference and the frequency (see the first exemplary embodiment of the present disclosure). The horizontal axis represents the frequency, and the vertical axis represents the speed of the motor. As illustrated in FIG. 20A, each of the phase difference and the frequency is operated, whereby it is possible to control the speed of the motor. For example, in a case where control is performed in a gray area, the control amount of the driving frequency is output in a range of 88 to 93 kHz, and the control amount of the phase difference is output in a range of 0 to ±120°. In the trained model according to the present disclosure, the control is performed by outputting two control amounts based on the input of the target speed. FIG. 20B illustrates a case where control is performed using the pulse width and the frequency according to the second exemplary embodiment of the present disclosure. Similarly, each of the pulse width and the frequency is operated, whereby it is possible to control the speed of the motor. For example, in a case where the control is performed in a gray area, the control amount of the driving frequency is output in the range of 88 to 93 kHz, and the control amount of the pulse width is output in a range of 0 to 50%. The control is performed by outputting the pulse width and the frequency based on the target speed input to the trained model.

A third exemplary embodiment of the present disclosure is described.

Figure 11:
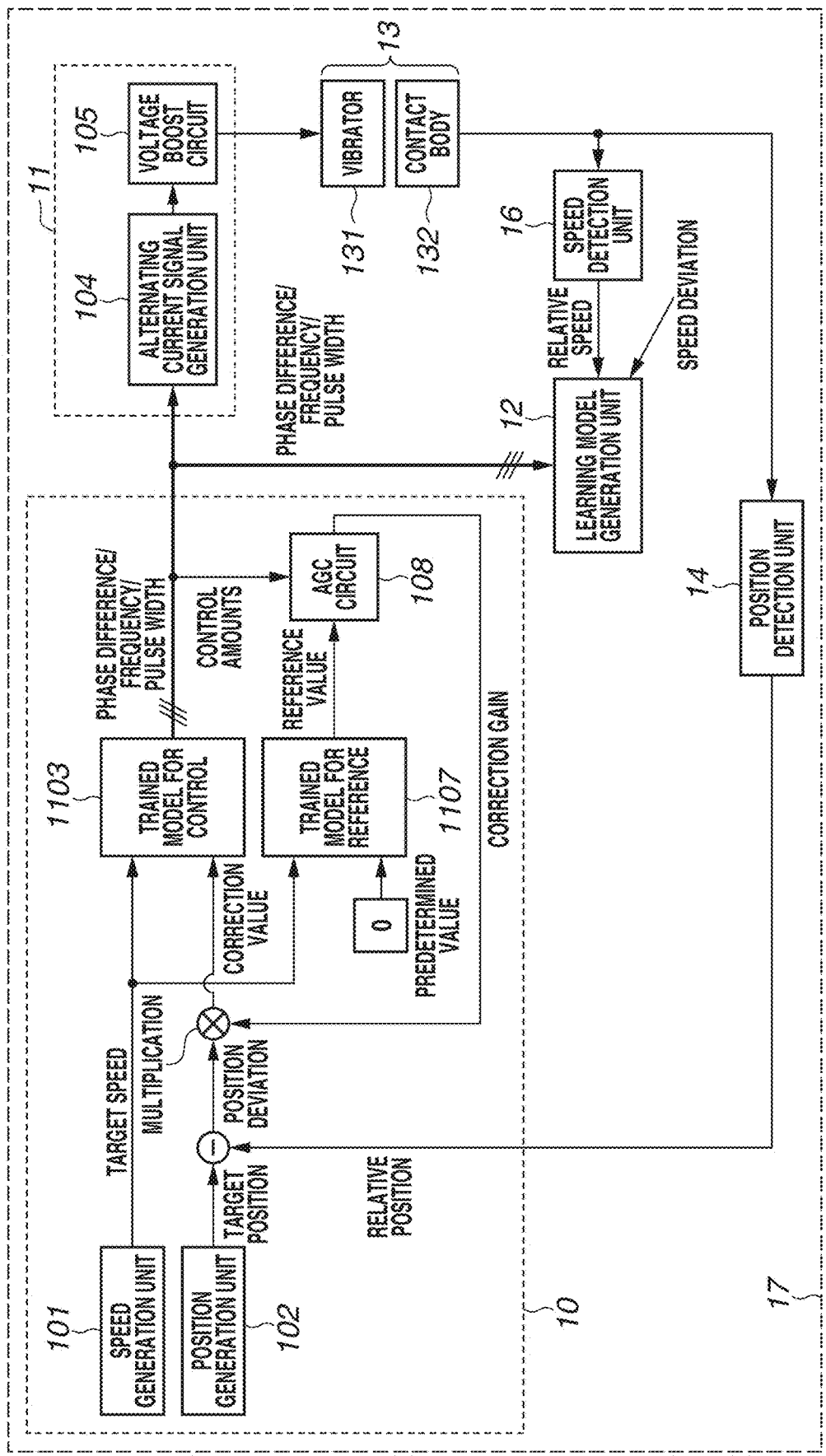
FIG. 11 is a diagram (a control block diagram) illustrating a vibration driving apparatus according to a third exemplary embodiment of the present disclosure.

FIG. 11 is a diagram (a control block diagram) illustrating a vibration driving apparatus according to the third exemplary embodiment of the present disclosure. In FIG. 11, the control apparatus 15 is constituted of the vibration driving apparatus 17 excluding the vibration motor 13 that is the control target.

In the control block diagram illustrated in FIG. 11, machine learning is performed using a phase difference, a frequency, and a pulse width as control amounts, and control is performed using a trained model obtained by the machine learning.

In the control block diagram, position feedback control of the vibration motor 13 (the vibration actuator) is performed based on control amounts (a phase difference, a frequency, and a pulse width) output from a control amount output unit 1103 including a trained model. To the control amount output unit 1103 including the trained model, the target speed and the correction value (the value based on the target position) of the position deviation (the first value) are input. Then, the phase difference, the frequency, and the pulse width calculated by the neural network are output to the driving unit 11, and the vibration motor 13 (the vibration actuator) is controlled. The learning model generation unit 12 acquires the three control amounts output from the control amount output unit 1103 including the trained model and the relative speed (the detection speed) and the speed deviation detected by the speed detection unit 16 as learning data and performs the machine learning on a learning model. A control amount and a reference value used in automatic gain control are any of phase differences, frequencies, and pulse widths, or a combination of these, and the control amount and the reference value are input to the AGC circuit 108.

With the use of the third exemplary embodiment of the present disclosure, even if the driving condition or the temperature environment changes, a phase difference, a frequency, and a pulse width are automatically corrected by automatic gain control. Thus, it is possible to obtain highly accurate and robust controllability.

Figure 17:
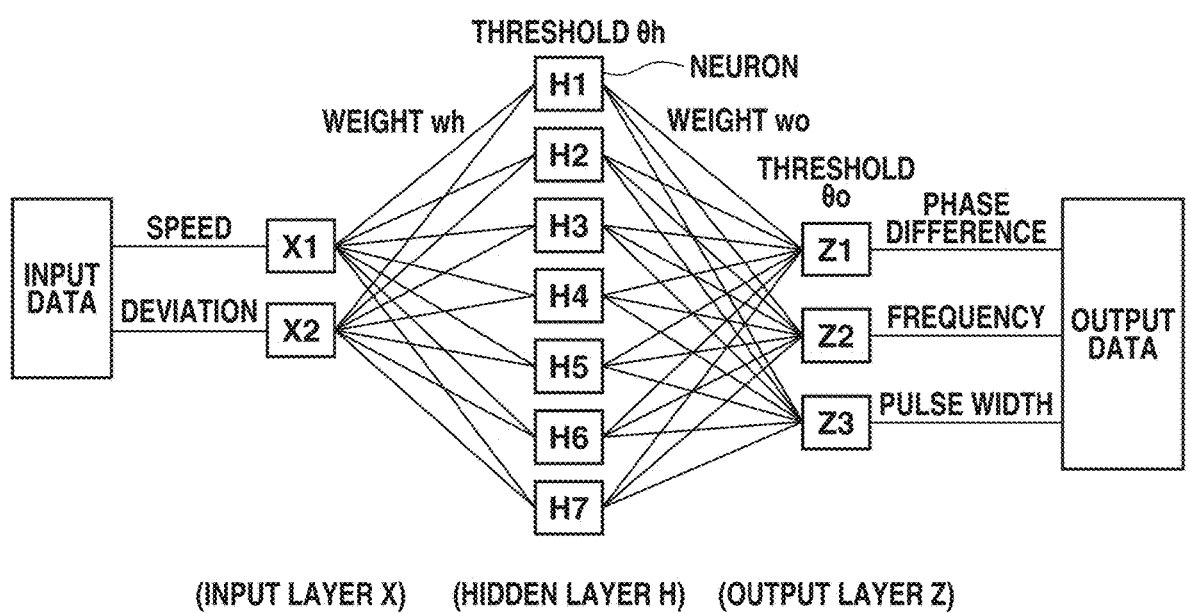
FIG. 17 illustrates a neural network structure of a learning model from which a phase difference, a frequency, and a pulse width are output.

FIG. 17 illustrates a neural network structure of a learning model from which the phase difference, the frequency, and the pulse width are output.

The control amount output unit 1103 including the trained model for control and a control amount output unit 1107 including a trained model for reference each has an NN structure to which the speed and the deviation are input and from which the three control amounts are output. As learning data used in machine learning, measurement data on control using the trained model may be used. As the learning data used in the machine learning, measurement data on control using an untrained model in which parameters are set using a random function may be used. As the learning data used in the machine learning, measurement data based on open driving in which control amounts are output in freely-set driving pattern, or time series measurement data based on PID control may be used.

When the weights and the thresholds of the NN are determined, parameters in optimal conditions may be selected from a plurality of pieces of learning data in terms of the position deviation (the first value) or power consumption. This is because there are an infinite number of conditions for obtaining a predetermined speed of the vibration motor 13, i.e., an infinite number of combinations of phase differences, frequencies, and pulse widths.

With the application of the third exemplary embodiment of the present disclosure, parameters for operating the vibration motor increase. Thus, it is possible to finely adjust control performance by performing appropriate machine learning.

A fourth exemplary embodiment of the present disclosure is described.

Figure 12:
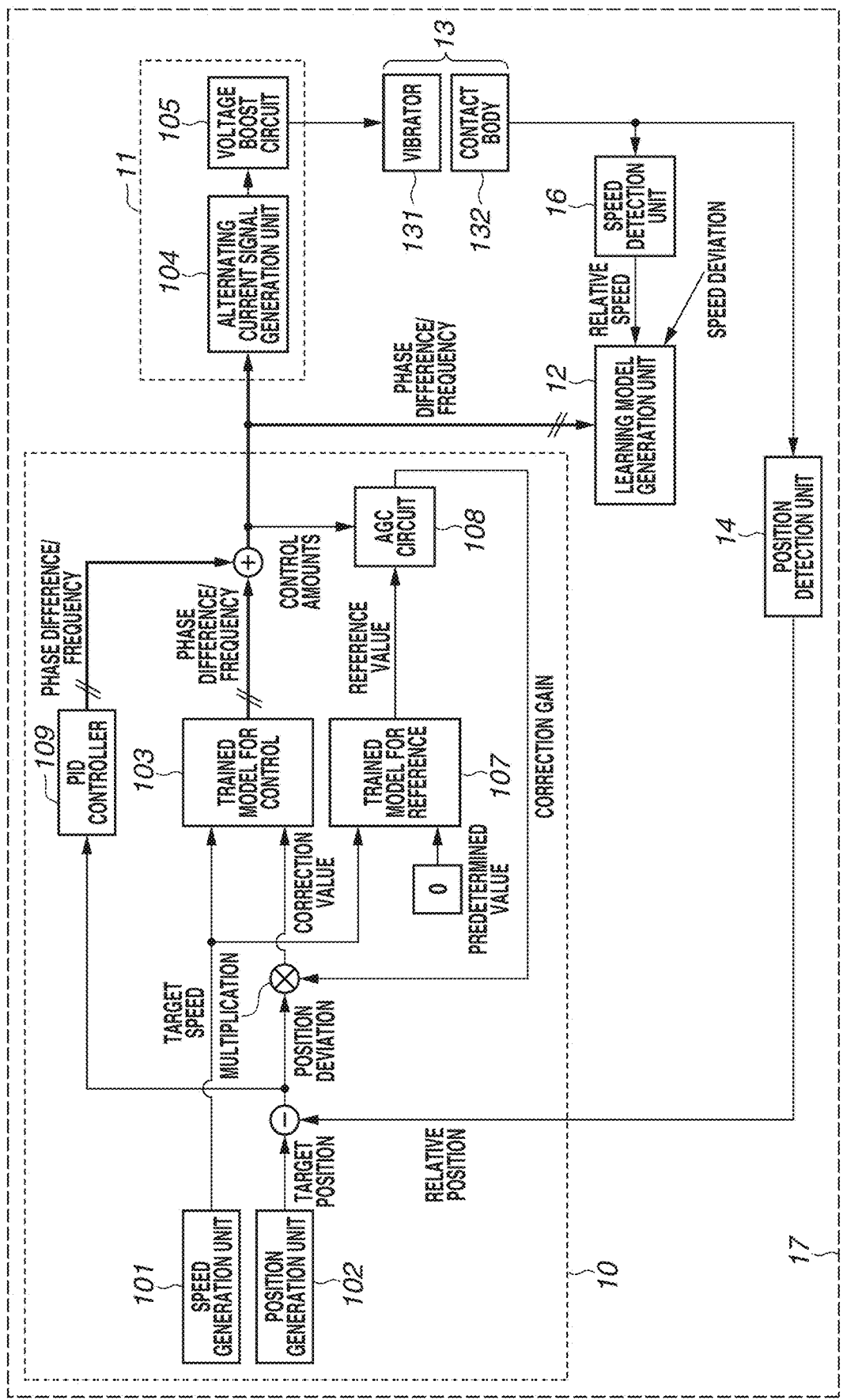
FIG. 12 is a diagram (a control block diagram) illustrating a vibration driving apparatus according to a fourth exemplary embodiment of the present disclosure.

FIG. 12 is a diagram (a control block diagram) illustrating a vibration driving apparatus according to the fourth exemplary embodiment of the present disclosure. In FIG. 12, the control apparatus 15 is constituted of the vibration driving apparatus 17 excluding the vibration motor 13 that is the control target.

In the control block diagram illustrated in FIG. 12, position feedback control of the vibration motor 13 (the vibration actuator) is performed in a configuration where a PID controller 109 is connected in parallel to the control amount output unit 103 including the trained model for control. The position deviation (the first value) is input to the PID controller 109 and subjected to PID calculations, and control amounts of a phase difference and a frequency are output from the PID controller 109. Alternatively, a component other than the PID controller 109 may be used. For example, proportional (P) control, proportional-integral (PI) control, or proportional-derivative (PD) control can also be applied. The target speed and the correction value obtained by multiplying the first value and the correction gain (the second value) obtained by the AGC circuit 108 (the value based on the target position) are input to the control amount output unit 103 including the trained model for control.

In other words, the target speed and the value based on the target position (the value based on the product of the first and second values) are input to the control amount output unit 103 including the trained model for control.

The control amounts output from the PID controller 109 and the control amounts output from the control amount output unit 103 including the trained model for control are added together and input to the driving unit 11. The added control amounts are also input to the AGC circuit 108 and compared with a reference value output from the control amount output unit 107 including the trained model for reference. The learning model generation unit 12 performs machine learning using the added control amounts, and the relative speed (the detection speed) and the speed deviation detected by the speed detection unit 16, thereby generating learning models of the control unit 10.

With the application of the fourth exemplary embodiment of the present disclosure, control amounts are automatically corrected by automatic gain control. Thus, regardless of the driving condition or the temperature environment, it is possible to obtain highly accurate and robust controllability. A PID controller is used in combination, whereby it is possible to flexibly adjust transmission characteristics of a control loop. Thus, it is possible to further improve positioning accuracy.

A fifth exemplary embodiment of the present disclosure is described.

Figure 16:
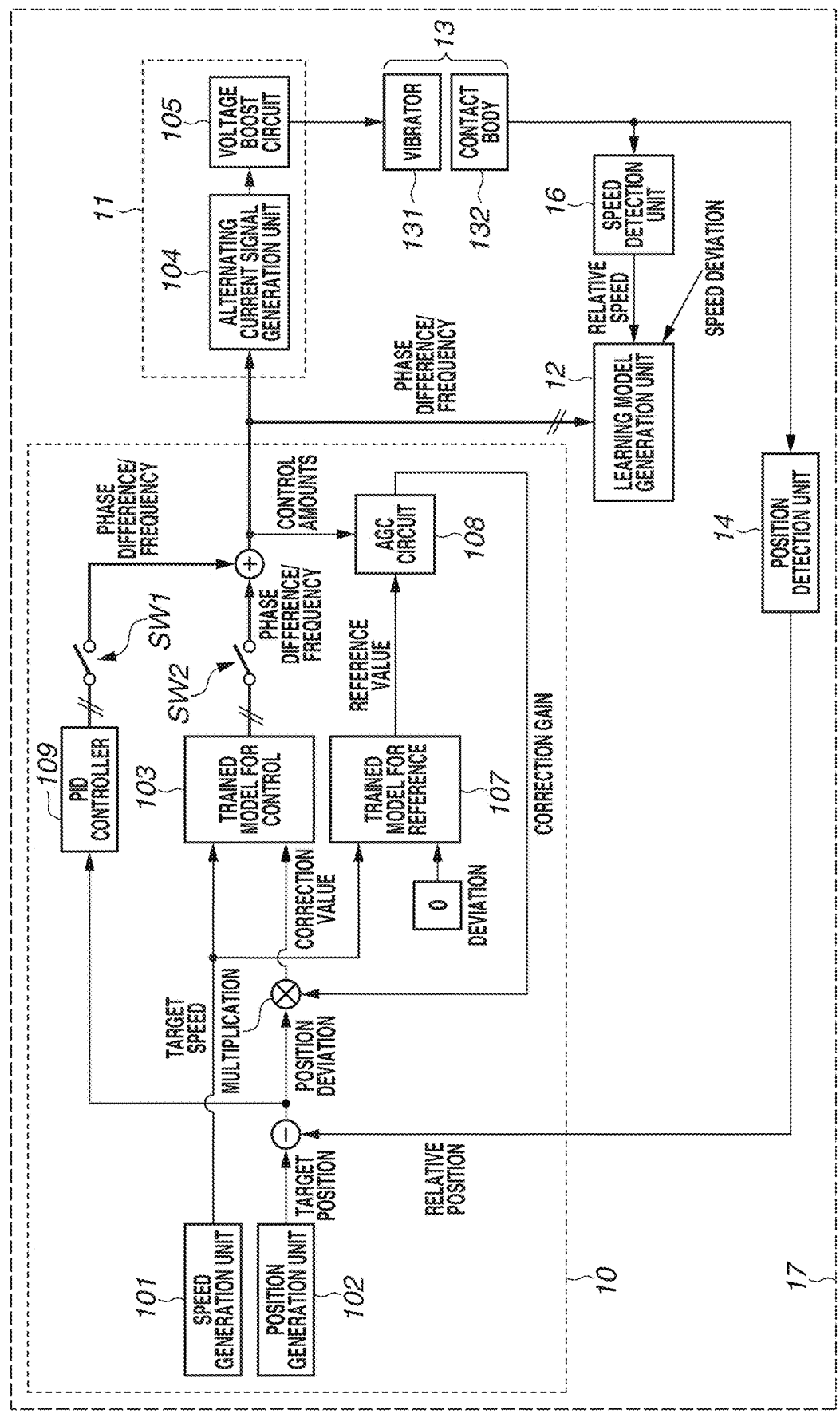
FIG. 16 is a diagram (a control block diagram) illustrating a vibration driving apparatus according to a fifth exemplary embodiment of the present disclosure.

FIG. 16 is a diagram (a control block diagram) illustrating a vibration driving apparatus according to the fifth exemplary embodiment of the present disclosure. In FIG. 16, the control apparatus 15 is constituted of the vibration driving apparatus 17 excluding the vibration motor 13 that is the control target.

In the control block diagram, the PID controller 109 is connected in parallel to the control amount output unit 103 including the trained model for control. Position feedback control of the vibration motor 13 (the vibration actuator) is selectively performed using a first switch SW1 (a switching unit) and a second switch SW2 (a switching unit). The switches SW1 and SW2 are provided in respective output portions of the PID controller 109 and the control amount output unit 103 including the trained model for control. Thus, control by only PID control and control by only the trained model can be selected depending on the driving condition. Alternatively, control may be performed by adding the control amounts from both the PID controller 109 and the control amount output unit 103.

The same applies to machine learning. For example, if learning is performed using only the PID control, it is possible to generate a learning model with prescribed control parameters even in the state where learning is not performed at all.

With the application of the fifth exemplary embodiment of the present disclosure, control amounts are automatically corrected by automatic gain control. Thus, regardless of the driving condition or the temperature environment, it is possible to obtain highly accurate and robust controllability.

A PID controller is selectively used, whereby it is possible to increase stability of control and learning.

A sixth exemplary embodiment of the present disclosure is described.

Figure 18B:
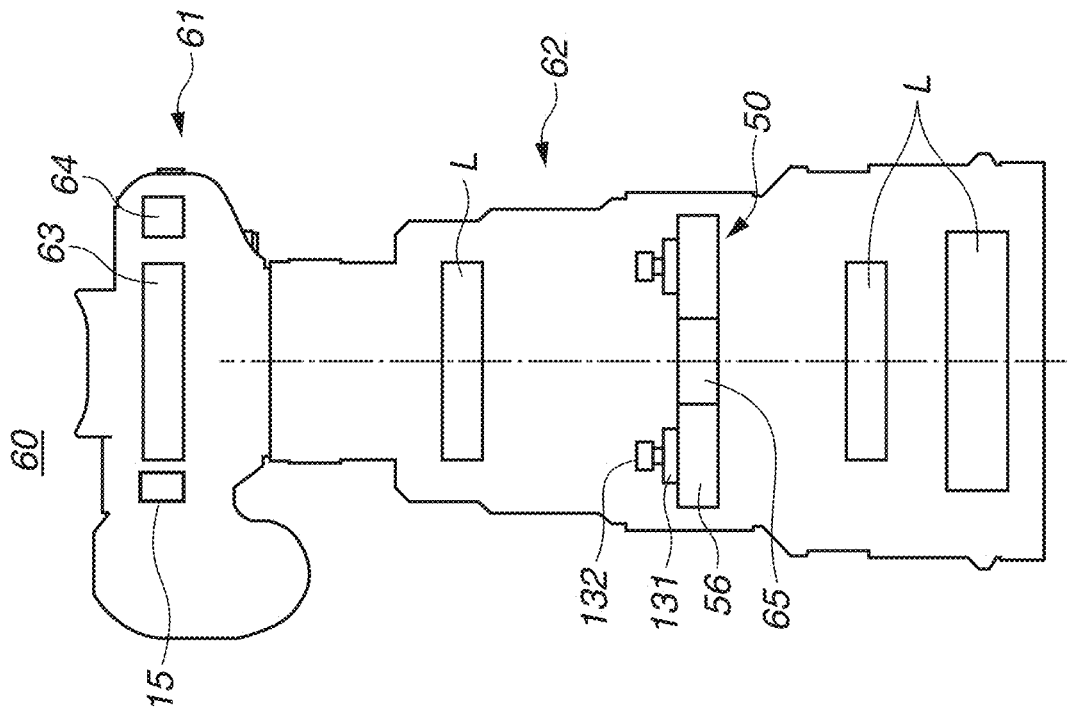
FIGS. 18A and 18B are a plan view illustrating an external appearance of an imaging apparatus that is an example of an application of the control apparatus according to the present disclosure, and a schematic diagram of an internal structure of the imaging apparatus.
Figure 18A:
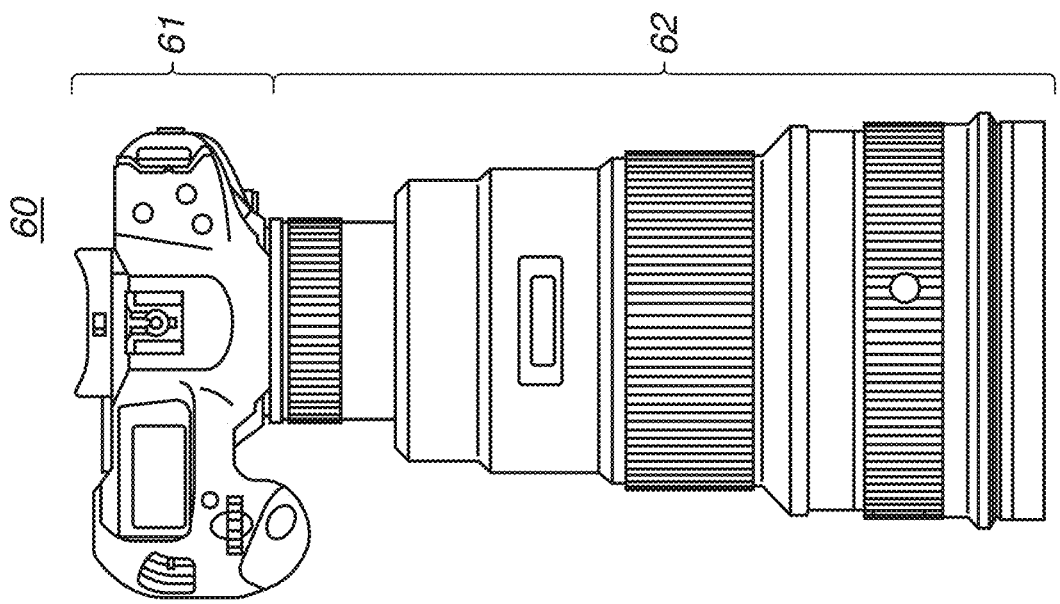

In the first exemplary embodiment of the present disclosure, an example has been described where the vibration motor control apparatus is used to drive a lens for autofocus of an imaging apparatus. An example of the application of the present disclosure is not limited thereto. For example, as illustrated in FIGS. 18A and 18B, the vibration motor control apparatus can also be used to drive a lens or an image sensor when camera shake is corrected. FIG. 18A is a plan view (a top view) illustrating the external appearance of an imaging apparatus 60. FIG. 18B is a schematic diagram of the internal structure of the imaging apparatus 60.

The imaging apparatus 60 generally includes a main body 61 and a lens barrel 62 attachable to and detachable from the main body 61. The main body 61 includes an image sensor 63 such as a charge-coupled device (CCD) sensor or a complementary metal-oxide-semiconductor (CMOS) sensor that converts an optical image formed by light having passed through the lens barrel 62 into an image signal, and a camera control microcomputer 64 that controls overall operation of the imaging apparatus 60. In the lens barrel 62, a plurality of lenses L such as a focus lens and a zoom lens is placed at predetermined positions. Into the lens barrel 62, an image blur correction device 50 is built. The image blur correction device 50 includes a circular plate member 56, and the vibrator 131 provided in the circular plate member 56. In a hole portion formed in the center of the circular plate member 56, an image blur correction lens 65 is placed. The image blur correction device 50 is placed so that the image blur correction device 50 can move the image blur correction lens 65 in a plane orthogonal to the optical axis of the lens barrel 62. In this case, the vibrator 131 is driven using the control apparatus 15 according to the present disclosure, whereby the vibrator 131 and the circular plate member 56 move relative to the contact body 132 fixed to the lens barrel 62, and the correction lens 65 is driven.

The control apparatus according to the present disclosure can also be used to drive a lens holder for movement of a zoom lens. Thus, the control apparatus according to the present disclosure can also be mounted on an interchangeable lens in addition to an imaging apparatus to drive a lens.

The vibration motor control apparatus described in the first exemplary embodiment of the present disclosure can also be used to drive an automatic stage. For example, as illustrated in FIG. 19, the vibration motor control apparatus can be used to drive an automatic stage of a microscope.

Figure 19:
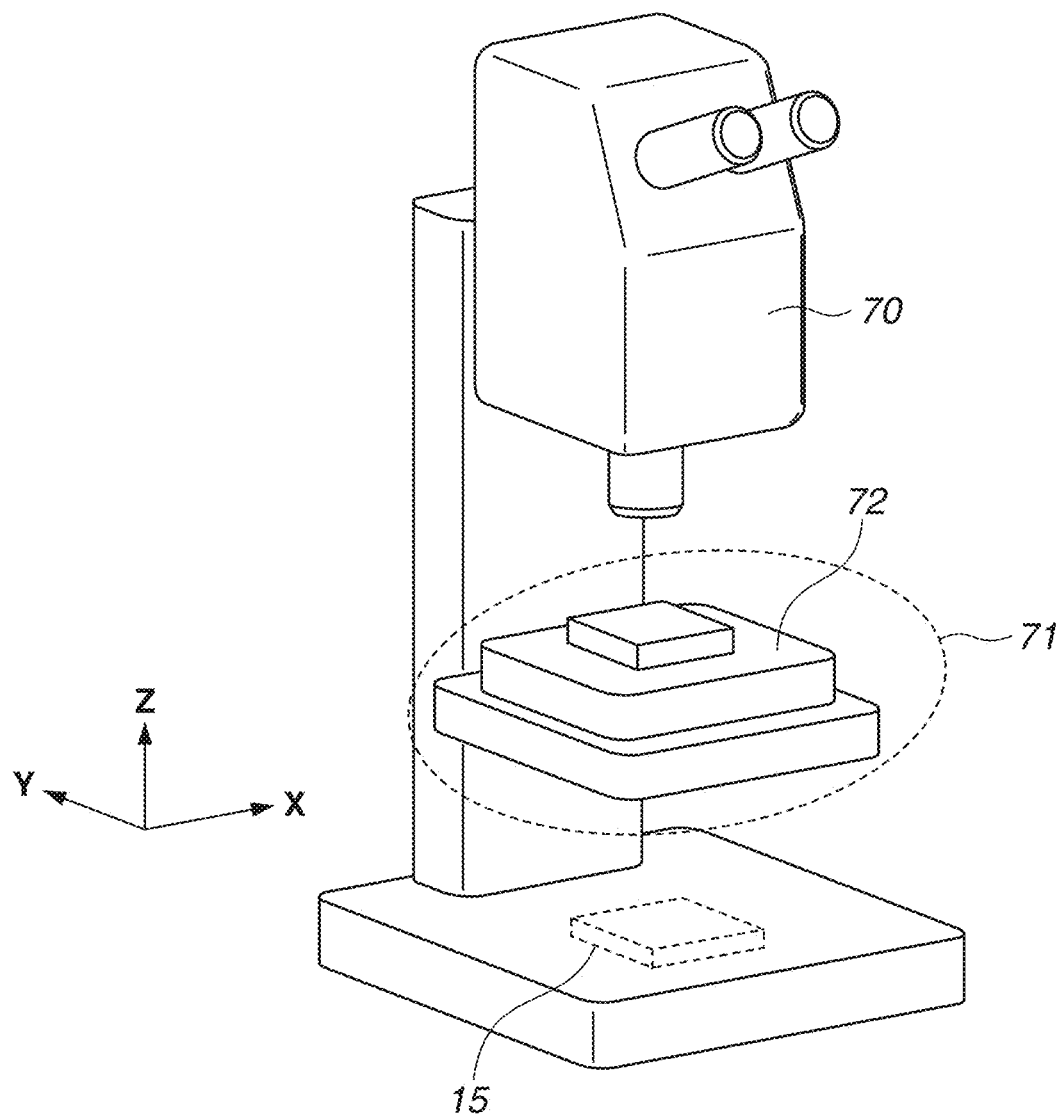
FIG. 19 is a diagram illustrating an external appearance of a microscope that is an example of the application of the control apparatus according to the present disclosure.

A microscope in FIG. 19 includes an image capturing unit 70 including a built-in image sensor and a built-in optical system, and an automatic stage 71 including a stage 72 that is provided on a base and moved by the vibration motor. An observation target object is placed on the stage 72, and an enlarged image is captured by the image capturing unit 70. If an observation range is a wide range, the stage 72 is moved by driving the vibration motor using the control apparatus 15 according to the first exemplary embodiment of the present disclosure or the control apparatus 15 according to the second exemplary embodiment of the present disclosure. Consequently, many images are captured by moving the observation target object in an X-direction and a Y-direction in FIG. 19. The captured images are combined together by a computer (not illustrated), whereby it is possible to acquire a single high-definition image having a wide observation range.

In the first to fifth exemplary embodiments, two trained models are included as the trained model. Specifically, the trained models are a first trained model to which the target speed and the value based on the target position are input, and a second trained model to which the target speed and the predetermined value are input.

Some embodiments of the present disclosure, however, are not limited thereto. Alternatively, the trained model may include only a single trained model. Specifically, the target speed and the value based on the target position as well as the target speed and the predetermined value may be input to the trained model at different timings.

While the present disclosure has described above in detail some exemplary embodiments, some embodiments are not limited to these specific exemplary embodiments. Some embodiments include various forms without departing from the spirit and scope of the disclosure. Further, each of the above exemplary embodiments merely represents one exemplary embodiment of the present disclosure, and the exemplary embodiments can be appropriately combined together.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2021-124633, which was filed on Jul. 29, 2021 and which is hereby incorporated by reference herein in its entirety.

What is claimed is:

1. A vibration actuator control apparatus that, with a vibration generated in a vibrator, moves a contact body in contact with the vibrator relative to the vibrator, the vibration actuator control apparatus comprising:
    a control amount output unit configured to, in a case where a target speed and a target position for moving the contact body relative to the vibrator are input to the control amount output unit, output a control amount for moving the contact body relative to the vibrator,
    wherein the control amount output unit includes a trained model trained by machine learning configured to output the control amount, in a case where the target speed and a value based on the target position are input to the trained model, to move the contact body relative to the vibrator,
    wherein the value based on the target position is a value based on a product of a first value and a second value,
    wherein the first value is a value based on a difference between the target position and a detection position detected from the vibration actuator moved based on the control amount, and
    wherein the second value is a value based on a ratio between the control amount output from the control amount output unit and a value output from the trained model in a case where the target speed and a predetermined value are input to the trained model.

2. The vibration actuator control apparatus according to claim 1, wherein the trained model is trained by machine learning using learning data to which a detection speed and a speed deviation being a difference between the target speed and the detection speed are input and from which the control amount is output.

3. The vibration actuator control apparatus according to claim 1, wherein the trained model is trained using learning data to which a detection speed and a predetermined value are input and from which the control amount is output.

4. The vibration actuator control apparatus according to claim 3, wherein the predetermined value is zero.

5. The vibration actuator control apparatus according to claim 1,
wherein the trained model has a neural network configuration including an input layer including one or more first neurons, a hidden layer including a plurality of second neurons, and an output layer including one or more third neurons, and
wherein parameters of the neural network configuration include a plurality of first weights assigned to a plurality of outputs from the one or more first neurons to the plurality of second neurons, a plurality of second weights assigned to a plurality of outputs from the plurality of second neurons to the one or more third neurons, a threshold for the second neurons, and a threshold for the third neurons.

6. The vibration actuator control apparatus according to claim 5, wherein in the trained model, the first weights, the second weights, the threshold for the second neurons, and the threshold for the third neurons are optimized.

7. The vibration actuator control apparatus according to claim 6, wherein in the trained model, the first weights, the second weights, the threshold for the second neurons, and the threshold for the third neurons set by a random function are optimized by the trained model performing machine learning based on an optimization algorithm.

8. The vibration actuator control apparatus according to claim 6, wherein in the trained model, the first weights, the second weights, the threshold for the second neurons, and the threshold for the third neurons learned by machine learning based on an optimization algorithm are optimized by the trained model performing the machine learning based on the optimization algorithm.

9. The vibration actuator control apparatus according to claim 7, wherein the optimization algorithm is any one of Adam, momentum, RMSprop, and stochastic gradient descent (SGD).

10. The vibration actuator control apparatus according to claim 1, further comprising a proportional-integral-derivative (PID) controller configured to, in a case where the first value is input to the PID controller, output a control amount for moving the contact body relative to the vibrator,
wherein the control amount output from the control amount output unit is a value based on a sum of a first control amount as the control amount output from the trained model and a second control amount as the control amount output from the PID controller.

11. The vibration actuator control apparatus according to claim 10, further comprising a switching unit configured to switch between the trained model and the PID controller.

12. The vibration actuator control apparatus according to claim 1, further comprising:
a position indication unit configured to output the target position; and
a position detection unit configured to output the detection position.

13. The vibration actuator control apparatus according to claim 1, wherein the control amount is at least one of a phase difference, a frequency, and a pulse width.

14. The vibration actuator control apparatus according to claim 1, wherein the trained model includes a first trained model to which the target speed and the value based on the target position are input, and a second trained model to which the target speed and the predetermined value are input.

15. The vibration actuator control apparatus according to claim 1, wherein the target speed and the value based on the target position, and the target speed and the predetermined value are input to the trained model at different timings.

16. A vibration driving apparatus comprising:
a vibration actuator configured to, based on a vibration generated in a vibrator, move a contact body in contact with the vibrator relative to the vibrator; and
the vibration actuator control apparatus according to claim 1.

17. An interchangeable lens comprising:
the vibration driving apparatus according to claim 16; and
a lens configured to be driven by the contact body being moved relative to the vibrator.

18. An imaging apparatus comprising:
the vibration driving apparatus according to claim 16; and
an image sensor configured to be driven by the contact body being moved relative to the vibrator.

19. An automatic stage comprising:
the vibration driving apparatus according to claim 16; and
a stage configured to be driven by the contact body being moved relative to the vibrator.

* * * * *